US011240728B2

(12) United States Patent
Livanos

(10) Patent No.: US 11,240,728 B2
(45) Date of Patent: *Feb. 1, 2022

(54) METHODS AND APPARATUS FOR SELECTING A NETWORK ROUTE FOR DATA COMMUNICATIONS FOR IOT DEVICES

(71) Applicant: Cisco Technology, Inc., San Jose, CA (US)

(72) Inventor: Konstantin Livanos, Naperville, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/599,789

(22) Filed: Oct. 11, 2019

(65) Prior Publication Data

US 2020/0045607 A1 Feb. 6, 2020

Related U.S. Application Data

(63) Continuation of application No. 15/893,379, filed on Feb. 9, 2018, now Pat. No. 10,499,306.

(Continued)

(51) Int. Cl.
*H04W 40/12* (2009.01)
*H04W 28/08* (2009.01)
(Continued)

(52) U.S. Cl.
CPC ........... *H04W 40/12* (2013.01); *H04L 45/127* (2013.01); *H04L 45/70* (2013.01); *H04L 47/122* (2013.01);
(Continued)

(58) Field of Classification Search
CPC combination set(s) only.
See application file for complete search history.

(56) References Cited

U.S. PATENT DOCUMENTS 6,650,621 B1 * 11/2003 Maki-Kullas ........... H04L 45/00
370/238
7,890,656 B2 * 2/2011 Nakamichi ........... H04L 47/125
709/241

(Continued)

FOREIGN PATENT DOCUMENTS

| JP | H02196539 A | 8/1990 |
| JP | 2016054342 A | 4/2016 |
| WO | 2017004158 A1 | 1/2017 |

OTHER PUBLICATIONS

Examination Report in counterpart European Application No. 18731932.2, dated Dec. 15, 2020, 13 pages.

(Continued)

*Primary Examiner* — Warner Wong

(57) ABSTRACT

In some implementations, a message indicating a request for delivery of data to user equipment (UE) (e.g. an IoT device) operative for communications in a mobile network may be received from an application server. One or more first loading or congestion indication values indicative of a first loading or congestion at one or more first network nodes along a first mobile network route may be obtained. In addition, one or more second loading or congestion indication values indicative of a second loading or congestion at one or more second network nodes along a second mobile network route may be obtained. The first or the second mobile network route may be selected based on at least one of the one or more first and the second loading or congestion indication values. The data may be delivered to the UE over the selected mobile network route.

20 Claims, 16 Drawing Sheets

Related U.S. Application Data

(60) Provisional application No. 62/510,583, filed on May 24, 2017.

(51) Int. Cl.

| | | |
|---|---|---|
| *H04W 28/02* | (2009.01) | |
| *H04W 4/70* | (2018.01) | |
| *H04L 12/721* | (2013.01) | |
| *H04W 48/18* | (2009.01) | |
| *H04L 12/803* | (2013.01) | |
| *H04L 29/08* | (2006.01) | |
| *H04W 4/14* | (2009.01) | |
| *H04L 12/801* | (2013.01) | |

(52) U.S. Cl.
CPC ............... *H04L 67/12* (2013.01); *H04W 4/14* (2013.01); *H04W 4/70* (2018.02); *H04W 28/0215* (2013.01); *H04W 28/0247* (2013.01); *H04W 28/08* (2013.01); *H04W 48/18* (2013.01); *H04L 47/14* (2013.01)

(56) References Cited

U.S. PATENT DOCUMENTS

| | | | | |
|---|---|---|---|---|
| 8,040,808 | B1* | 10/2011 | Kasturi | ................ H04L 45/124 |
| | | | | 370/238 |
| 9,143,436 | B2 | 9/2015 | Hiramoto et al. | |
| 9,197,533 | B1 | 11/2015 | Xia et al. | |
| 10,887,234 | B1* | 1/2021 | Singh | ................ H04L 41/083 |
| 2002/0048750 | A1* | 4/2002 | Corless | ................ B01J 19/0046 |
| | | | | 435/6.14 |
| 2007/0047446 | A1* | 3/2007 | Dalal | ................ H04L 47/31 |
| | | | | 370/237 |
| 2008/0181178 | A1 | 7/2008 | Shaheen | |
| 2009/0052466 | A1* | 2/2009 | Khalid | ................ H04L 45/122 |
| | | | | 370/467 |
| 2010/0046502 | A1 | 2/2010 | Lei et al. | |
| 2010/0304717 | A1* | 12/2010 | Bhatt | ................ H04W 4/14 |
| | | | | 455/412.1 |
| 2011/0205898 | A1 | 8/2011 | Ichiki et al. | |
| 2011/0208802 | A1 | 8/2011 | Gunnalan et al. | |
| 2012/0250514 | A1 | 10/2012 | Hiramoto et al. | |
| 2013/0021910 | A1 | 1/2013 | Crisan et al. | |
| 2015/0051823 | A1 | 2/2015 | Joglekar | |
| 2015/0087355 | A1* | 3/2015 | Jouin | ................ G06F 3/1423 |
| | | | | 455/552.1 |
| 2016/0294677 | A1 | 10/2016 | Kazerani et al. | |
| 2016/0380892 | A1 | 12/2016 | Mahadevan et al. | |
| 2017/0006499 | A1 | 1/2017 | Hampel et al. | |
| 2017/0111185 | A1 | 4/2017 | Tamaguchi et al. | |
| 2017/0126527 | A1 | 5/2017 | Ouedraogo et al. | |
| 2017/0339071 | A1 | 11/2017 | Cheng et al. | |
| 2018/0027097 | A1 | 1/2018 | Boucadair et al. | |
| 2018/0035351 | A1 | 2/2018 | Kodaypak | |
| 2018/0063841 | A1 | 3/2018 | Song et al. | |
| 2018/0097894 | A1* | 4/2018 | Li | ................ H04L 67/141 |
| 2018/0152890 | A1 | 5/2018 | Jia | |
| 2018/0205628 | A1* | 7/2018 | Gilson | ................ H04L 47/00 |
| 2018/0279115 | A1* | 9/2018 | Tanna | ................ H04W 8/22 |
| 2018/0343601 | A1 | 11/2018 | Livanos | |
| 2020/0007664 | A1* | 1/2020 | Kanugovi | ................ H04L 69/14 |
| 2020/0014753 | A1* | 1/2020 | Kurian | ................ G06F 15/76 |

OTHER PUBLICATIONS

3GPP, "3rd Generation Partnership Project; Technical Specification Group Services and System Aspects; Architecture enhancements to facilitate communications with packet data networks and applications (Release 14)", 3GPP TS 23.682, V14.6.0, Dec. 2017, 107 pages.

LTE; General Packet Radio Service (GPRS) Enhancements for Evolved Universal Terrestrial Radio Access Network (E-UTRAN) Access (3GPP TS 23.401 version 14.5.0 Release 14), ETSI TS 123 401 V14.5.0, Oct. 2017, pp. 1-399.

3rd Generation Partnership Project; Technical Specification Group Services and System Aspects; Architecture Enhancements to Facilitate Communications with Packet Data Networks and Application (Release 16), 3GPP TS 23.683 V16.0.0, Sep. 2018, pp. 1-126.

International Search Report for corresponding PCT/US2018/032634 dated Jul. 25, 2018.

Radhika Gupta, "A Survey Congestion Based Routing Protocols for Better Performance of Mobile Adhoc Networks", International Journal of Advanced Research in Computer and Communication Engineering, vol. 5, Issue Jul. 7, 2016, pp. 1-3.

Michael Stewart,"CASPaR: Congestion Avoidance Shortest Path Routing for Delay Tolerant Networks", nternational Journal of Distributed Sensor Networks, vol. 13(11 ), 2017 pp. 1-15.

3rd Generation Partnership Project; Technical Specification Group Services and System Aspects; Architecture Enhancements to Facilitate Communications with Packet Data Networks and Applications (Release 13), 3GPP TS J3.682, V13.5.0, Mar. 2016, pp. 1-90.

* cited by examiner

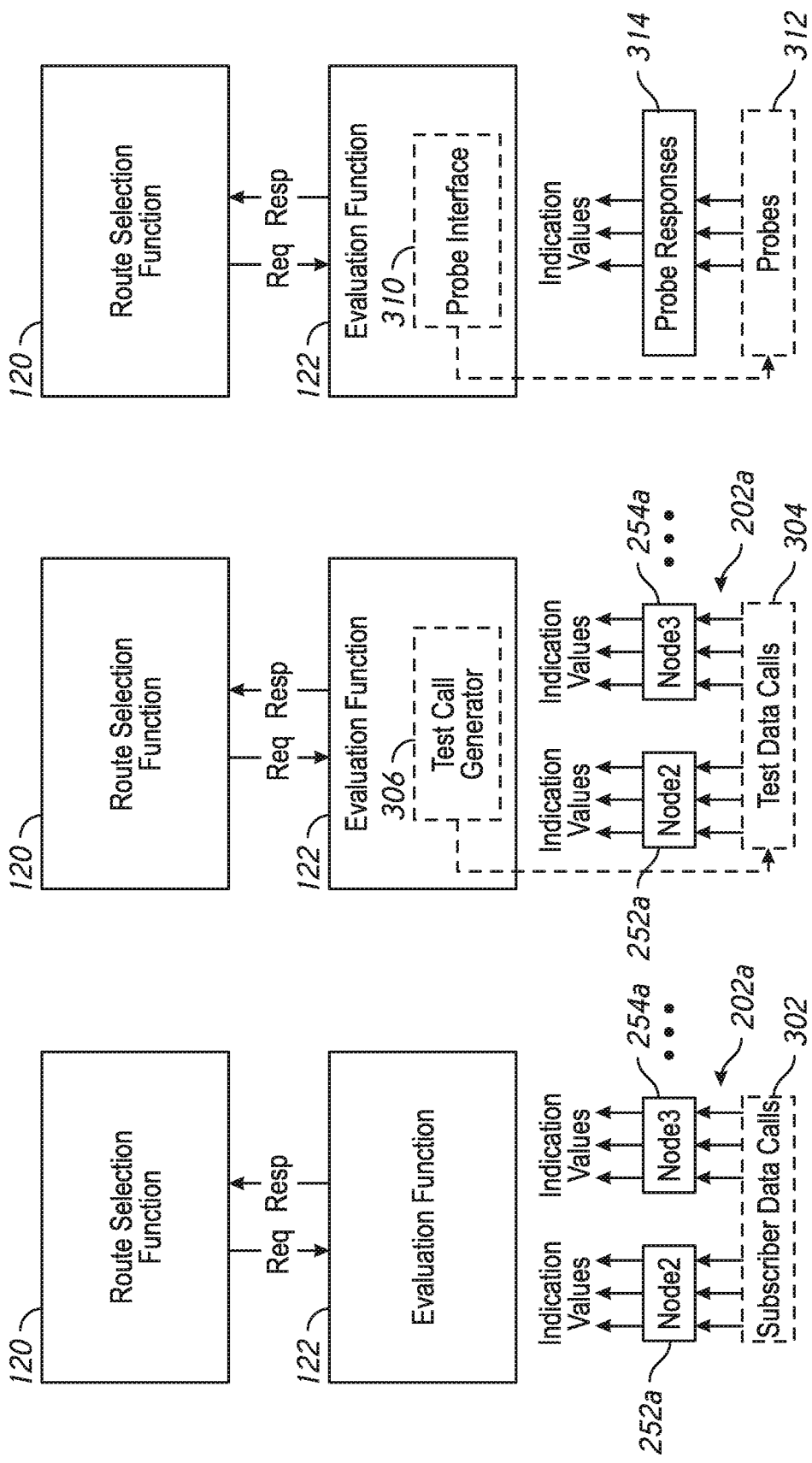

METHODS AND APPARATUS FOR SELECTING A NETWORK ROUTE FOR DATA COMMUNICATIONS FOR IOT DEVICES

CROSS-REFERENCE TO RELATED APPLICATION

This application is a Continuation application of U.S. patent application Ser. No. 15/893,379 filed on Feb. 9, 2018, which claims the benefit of priority from U.S. Provisional Patent Application No. 62/510,583 having a filing date of May 24, 2017, the contents of which are hereby incorporated by reference in their entireties for all purposes.

TECHNICAL FIELD

The present disclosure relates generally to selecting a mobile network route for data communications, and in particular for Internet of Things (IoT) devices.

BACKGROUND

There is a need for methods and apparatus for selecting a mobile network route (e.g. a route for IP data delivery or non-IP data delivery) for data communications in a mobile network, which may be suitable for use in data communications with user equipment (UE) including Internet of Things (IoT) devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 3A-3C are illustrative diagrams of the route selection function which may be operative in connection with various implementations of a load or performance evaluation function;

Figure 1A:
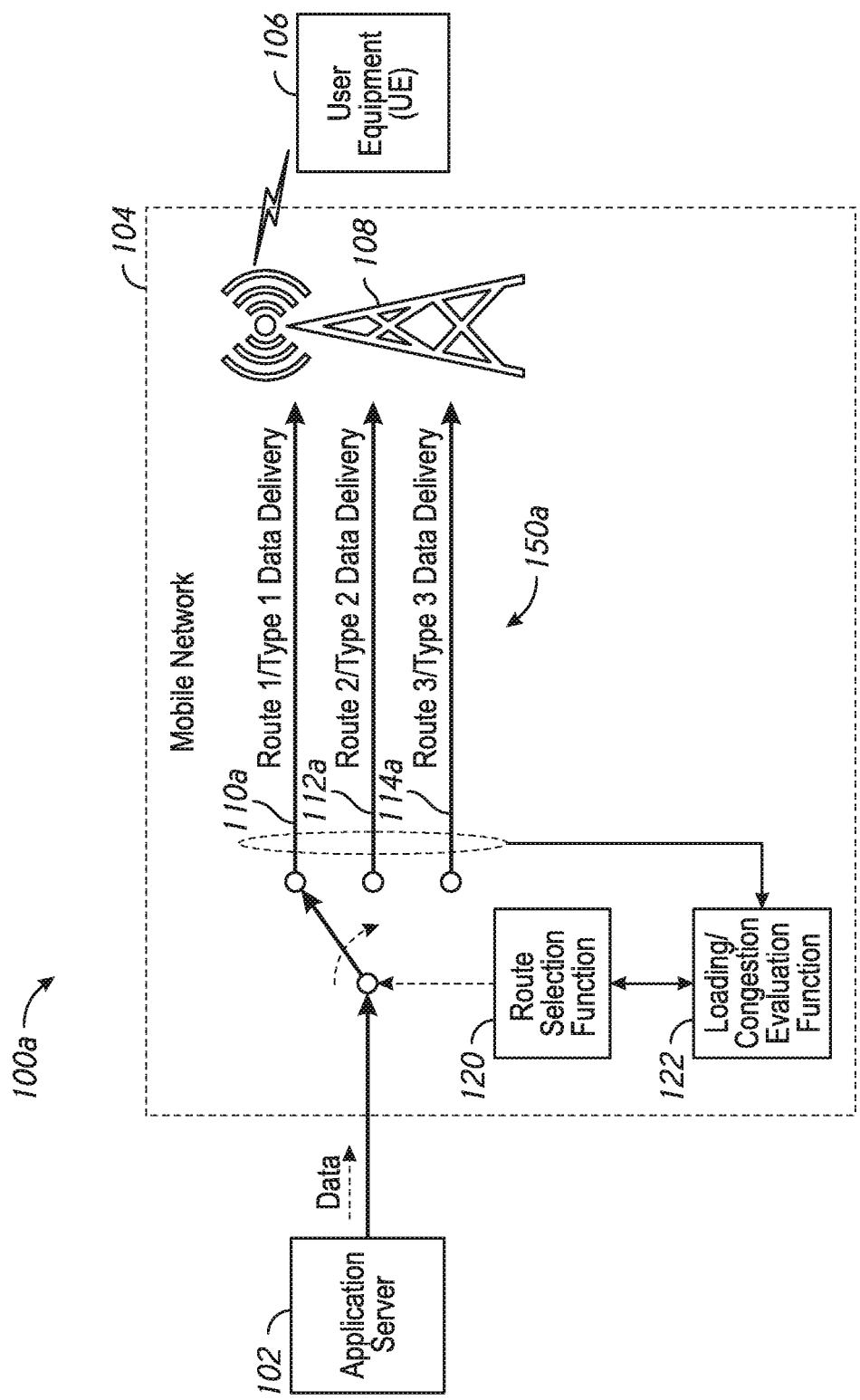
FIGS. 1A-1B are illustrative representations of a communication system which includes a mobile network for communicating data between an application server (AS) and a user equipment (UE) (e.g. an Internet of Things or IoT device, such as a CAT-M1 device or an NB IoT device), where one of a plurality of mobile network routes for the data communication may be selected by a route selection function.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in selecting a mobile network route for data communications for a user equipment (UE) in a mobile network, suitable for use for data communications involving Internet of Things (IoT) devices, are described herein.

In one illustrative example, a message indicating a request for delivery of data to a user equipment (UE) (e.g. an IoT device, such as a CAT-M1 device) operative for communications in a mobile network may be received from an application server. One or more first loading or congestion indication values indicative of a first loading or congestion at one or more first network nodes along a first mobile network route (e.g. a route for IP data delivery) may be obtained. In addition, one or more second loading or congestion indication values indicative of a second loading or congestion at one or more second network nodes along a second mobile network route (e.g. a route for non-IP data delivery or NIDD) may be obtained. The first or the second mobile network route may be selected based on at least one of the one or more first and the second loading or congestion indication values (and e.g. subscription tier or type data). The data may be delivered to the UE over the selected mobile network route.

In some implementations, when the UE is initially not attached to the network, the technique may further involve sending a message (e.g. an SMS message) which includes a request for the UE to attach, where the request includes an attach type associated with the selected mobile network route.

Example Embodiments

FIG. 1A is an illustrative representation of a communication system 100a which includes a mobile network 104. Mobile network 104 may facilitate data communications between an application server 102 and a user equipment (UE) 106. UE 106 may be connected to mobile network 104 via a base station 108 (e.g. an eNodeB or gNodeB) or access point (AP). UE 106 may be an Internet of Things (IoT) device, for example, a narrowband (NB) IoT device or a category (CAT) M1 device.

Data from application server 102 to UE 106 may be communicated over a selected one of a plurality of different mobile network routes 150a for data communications. In the example shown, mobile network routes 150a may include a first mobile network route 110a ("Route 1"), a second mobile network route 112a ("Route 2"), and a third mobile network route 114a ("Route 3"). Each one of mobile network routes 150a in the mobile network 104 may be associated with a specific type of data delivery for UE 106. Each specific type of data delivery for UE 106 may involve a different type of attachment of UE 106 to the mobile network 106.

In the example illustrated in FIG. 1A, first mobile network route 110a may be associated with a first type of data delivery associated with a first type of UE attachment, second mobile network route 112a may be associated with a second type of data delivery associated with a second type of UE attachment, and third mobile network route 114a may be associated with a third type of data delivery associated with a third type of UE attachment.

Figure 1B:
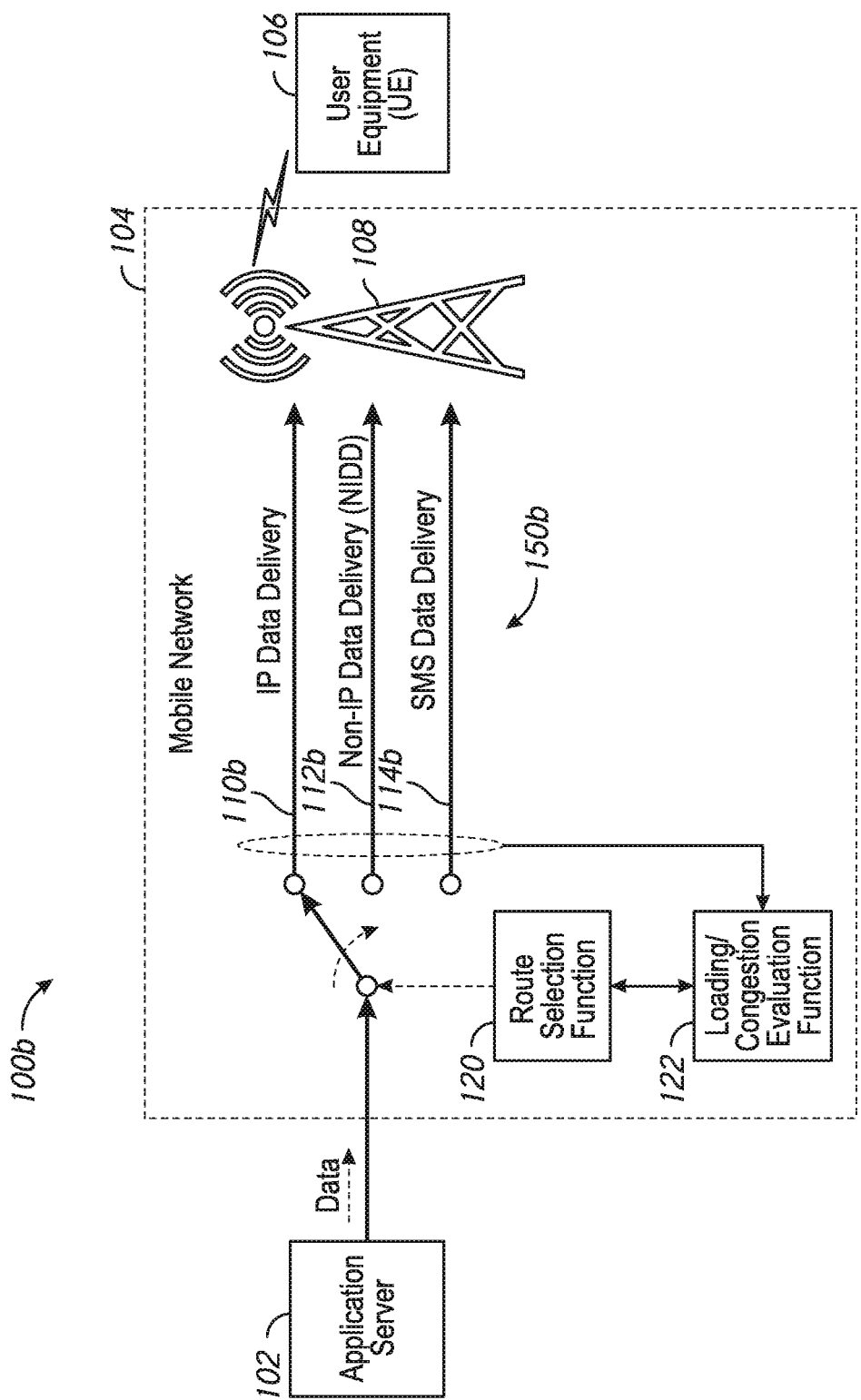

In a related example illustrated in FIG. 1B, a first mobile network route 110b may be associated with a first type of data delivery comprising Internet Protocol (IP) data delivery, a second mobile network route 112b may be associated with a second type of data delivery comprising non-IP data delivery (NIDD), and a third mobile network route 114b may be associated with a third type of data delivery comprising a short message service (SMS) data delivery. In this example, the first, second, and third types of data delivery (i.e. IP, NIDD, and SMS) may be applicable to UEs that are CAT-M1 devices, and the second and third types of data delivery (i.e. NIDD and SMS) may be applicable to UEs that are NB IoT devices.

Referring back to FIG. 1A, mobile network 106 is shown to further include a route selection function 120. Route selection function 120 may be configured to dynamically select one of the mobile network routes 150a for data communications between application server 102 and UE 106. The selection of a mobile network route by route selection function 120 is illustrated in FIG. 1A for clarity with use of a switching or selection mechanism. By "dynamic" selection of a route, it is meant that route selection function 120 may select one of mobile network routes 150a for data communications for UE 106 on a request-by-request basis (i.e. for each request for data delivery to UE 106). Put another way, route selection function 120 may "dynamically" select a suitable or appropriate one of mobile network routes 150a for data communications for UE 106 at or near the time of receipt of the request and/or the (initial) data to communicate to UE 106.

Figure 2A:
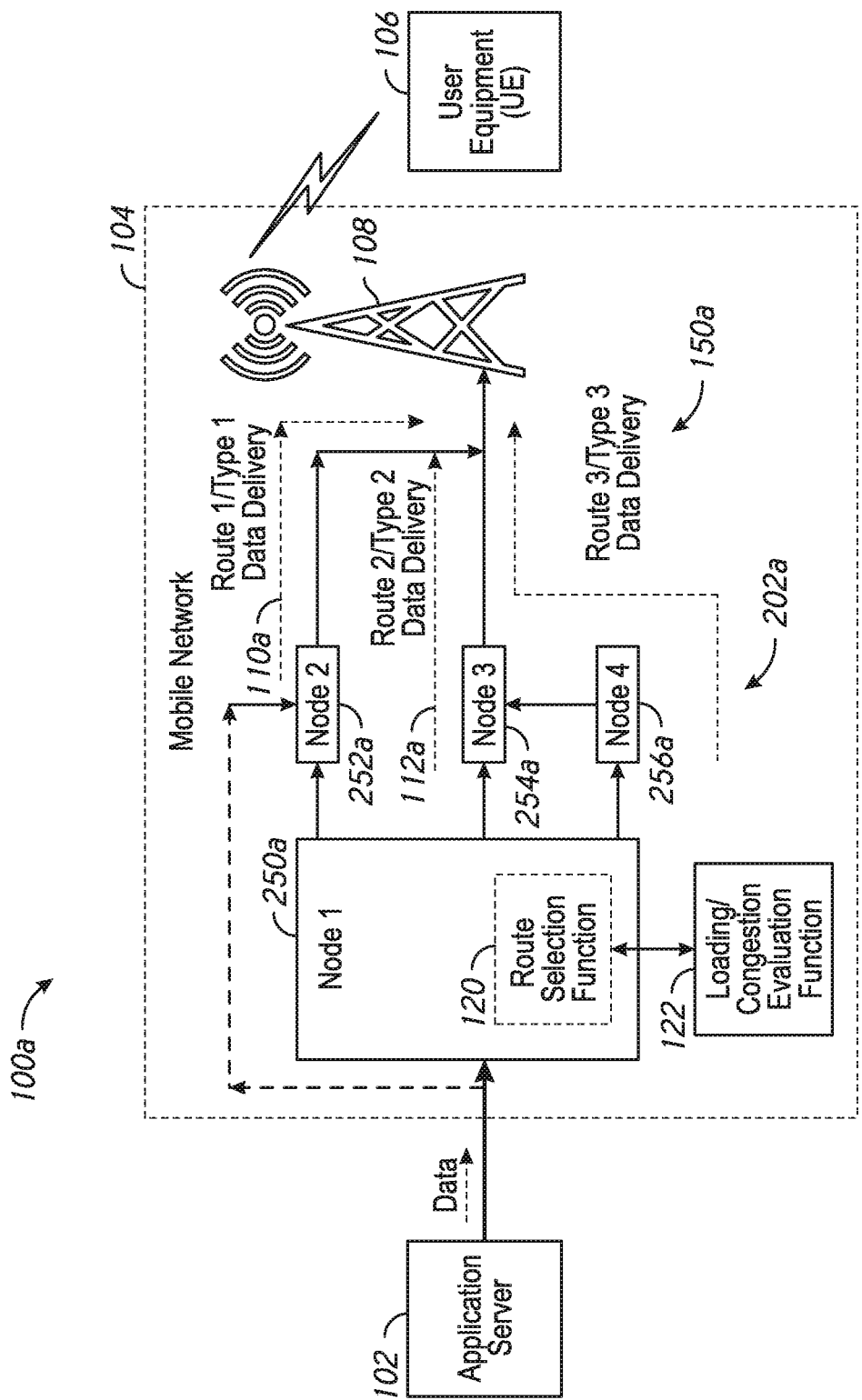
FIGS. 2A-2B are illustrative representations of the communication system of FIGS. 1A-1B, where each of the plurality of mobile network routes for the data communication include one or more different network nodes.

Referring now to FIG. 2A, communication system 100a which includes mobile network 104 of FIG. 1A is shown again, but with additional illustration of a plurality of network nodes 202a provided in the mobile network 104. One or more of these different network nodes 202a may be provided along each one of mobile network routes 150a for data communication between application server 102 and UE 106. In some implementations, each one of network nodes 202a may be or include or more predetermined network functions (e.g. control plane or user plane functions) for use in facilitating communications in mobile network 104.

In the example illustrated in FIG. 2A, the plurality network nodes 202a include a network node 250a ("Node 1"), a network node 252a ("Node 2"), a network node 254a ("Node 3"), and a network node 256a ("Node 4"). Here, first mobile network route 110a for the first type of data delivery may include network nodes 250a and 252a (i.e. Nodes 1 and 2), second mobile network route 112a for the second type of data delivery may include network nodes 250a and 254a (i.e. Nodes 1 and 3), and third mobile network route 114a for the third type of data delivery may include network nodes 250a, 256a, and 254a (i.e. Nodes 1, 4, and 3). Note that mobile network route 110a for the first type of data delivery may alternatively include network node 252a (i.e. Node 3) and exclude network node 250a (i.e. Node 1).

Figure 2B:
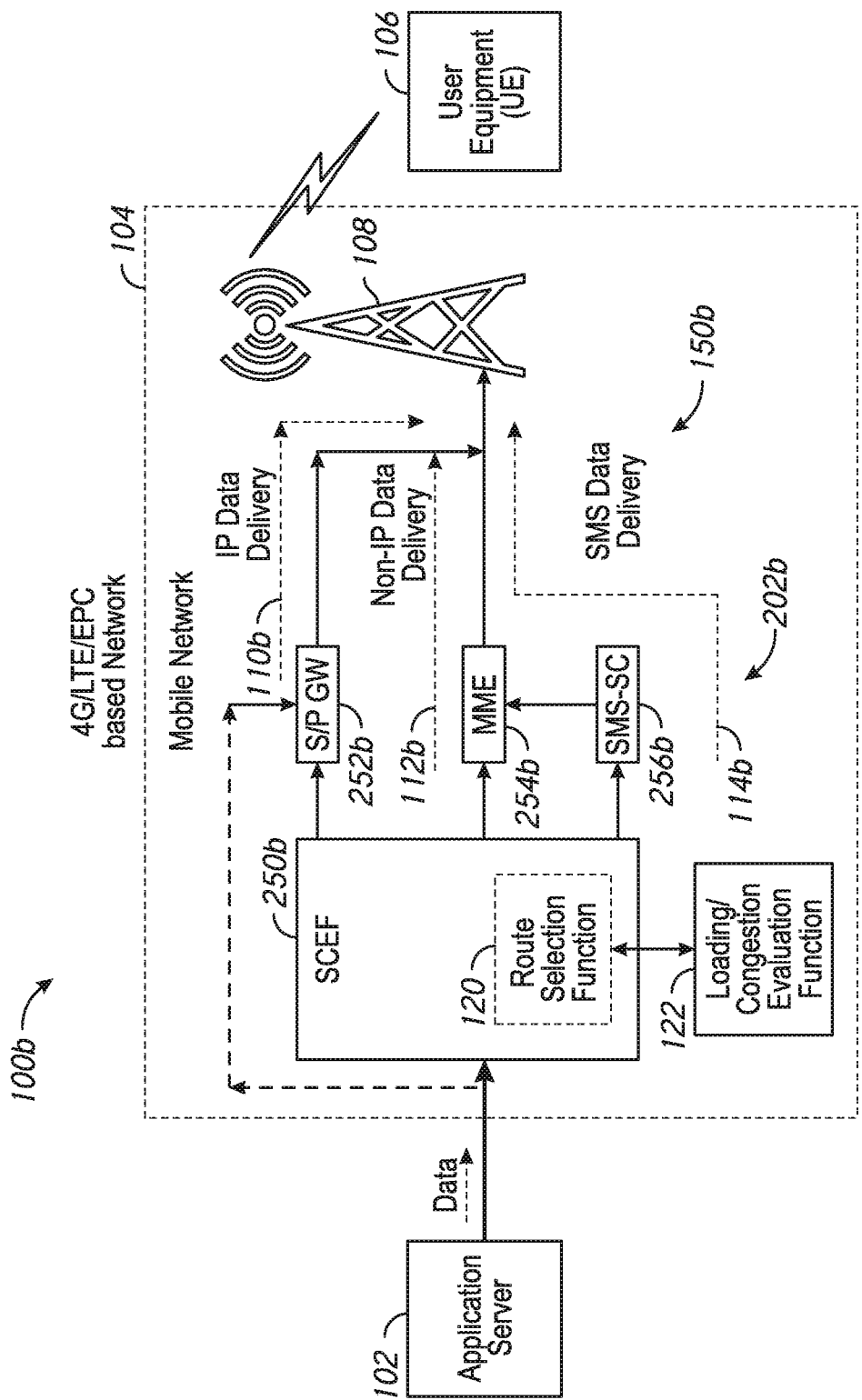

In a related example illustrated in FIG. 2B, each one or network nodes 202a of FIG. 2A is shown to be or include a network entity or function for use in facilitating communications in a fourth generation (4G)/long term evolution (LTE), evolved packet core (EPC) based network. More specifically, network node 250a of FIG. 2A is shown to be or include a service capability exposure function (SCEF) 250b in FIG. 2B; network node 252a of FIG. 2A is shown to be or include a serving or packet data network (S/P) gateway (GW) 252b in FIG. 2B; network node 254a of FIG. 2A is shown to be or include a mobility management entity (MME) 254b in FIG. 2B; and network node 256a of FIG. 2A is shown to be or include an SMS service center (SMS-SC) 256b of FIG. 2B.

In the example of FIG. 2B, first mobile network route 110b associated with IP data delivery may include one or more network nodes including SCEF 250b and S/P GW 252b (e.g. where the SGi interface terminates at the SCEF) or alternatively S/P GW 252b without SCEF 250b (e.g. where the SGi interface terminates at the AS); second mobile network route 112b associated with non-IP data delivery (NIDD) may include one or more network nodes including SCEF 250b and MME 254b; and third mobile network route 114 associated with SMS data delivery may include one or more network nodes including SCEF 250b, SMS-SC 256b, and MME 254b. In some implementations as indicated in FIGS. 2A and 2B, route selection function 120 is included in or as part of network node 250a of FIG. 2A or SCEF 250b of FIG. 2B for the 4G/LTE/EPC network. Note that further illustrative example techniques of the 4G/LTE/EPC network implementation are shown and described later in relation to FIGS. 6, 7A-7B, 8, and 9A-9B.

In some implementations, the techniques of the present disclosure are implemented in a fifth generation (5G) mobile network, where network node 250a of FIG. 2A is or includes a network exposure function (NEF); network node 252a of FIG. 2A is or includes a user plane function (UPF); network node 254a of FIG. 2A is an access and mobility management function (AMF); and network node 256a of FIG. 2A is an SMS-SC function. Here, the route selection function may be included in or a part of the NEF. Note that an additional general description of the 5G mobile network implementation is shown and described later in relation to FIGS. 10A-10B.

Referring back to FIG. 2A, as previously described, mobile network 106 includes route selection function 120 which is configured to select one of the mobile network routes 150a for data communications between application server 102 and UE 106. More particularly, route selection function 120 may be configured to select one of the mobile network routes 150a for the data communications based on one or more loading or congestion indication values indicative of a loading or congestion at one or more network nodes 202a along the one or more mobile network routes 150a. Route selection function 120 may obtain the one or more loading or congestion status indication values from evaluation function 122 (e.g. by requesting and receiving, pushing, or publish-subscribe processing).

In some implementations, the one or more loading or congestion indication values may be or include one or more (e.g. discrete) status indicators indicative of a loading or congestion status. For example, a status indicator may indicate "0" for NORMAL loading/congestion, and "1" for HIGH loading/congestion. As another example, a status indicator may indicate "0" for LOW loading/congestion, "1" for NORMAL loading/congestion, and "2" for HIGH loading/congestion. As yet another example, a status indicator may be "pushed" or provided in an event notification (e.g. only) in response to a highly-congested state (HIGH congestion). In any case, route selection function 120 may obtain from evaluation function 122 the one or more loading or congestion status indicators and select one of the mobile network routes 150a based on the obtained one or more loading or congestion status indictors.

In some implementations, a status indicator may be determined by evaluation function 122 based on one or more (e.g. raw) node parameters associated with the one or more network nodes. Such a node parameter may be any suitable node parameter, such as a memory utilization parameter (e.g. buffer availability or utilization, for user data or session information), a CPU utilization parameter, a number of requests served (e.g. a current number of requests being served or within a current time window), and a node response time (e.g. the time it takes to receive a response/acknowledgment to a request). Here, evaluation function 122 may be configured to obtain one or more raw node parameters indicative of a loading or congestion at one or more network nodes along one or more mobile network routes 150a, and determine one or more loading or congestion status indicators corresponding to such loading or congestion based on the one or more loading or congestion indication values.

For example, evaluation function 122 may receive/obtain a node parameter, compare the node parameter with one or more threshold values, and determine/select one of the status indicators (e.g. NORMAL or HIGH loading/congestion) based on the outcome of the comparison. As another example, evaluation function 122 may receive/obtain node parameters and compare them to each other for load balancing purposes, and determine/select one of the status indicators (e.g. NORMAL or HIGH loading/congestion) in order to bias the route selection at route selection function 120 for load balancing. As yet another example, evaluation function 122 may receive/obtain node parameters and compare them to each other, and determine/select one of a plurality of route selection indicators (e.g. "1"=IP or WB route selection, or "0"=Non-IP or NB route selection) to send to route selection function 120. Note that, in the above examples, the node parameter evaluation may be performed with respect to each network node along a given mobile network route, where like node parameters of all of the network nodes along the mobile network route are summed, averaged, or otherwise combined for evaluation of the entire mobile network route.

In other implementations, the one or more loading or congestion indication values obtained by route selection function 120 may be or include one or more of the actual raw node parameters themselves (e.g. a memory utilization parameter, a CPU utilization parameter etc.), or a parameter value derived from one or more of the actual raw node parameters (e.g. a calculated parameter value based on both memory utilization and CPU utilization parameters). Here, route selection function 120 may include some or all of the functionality of evaluation function 122.

In some implementations, route selection function 120 may be configured to obtain a subscription tier or type associated with UE 106, and select one of the mobile network routes 150b based on the one or more loading or congestion indication values and the subscription tier or type. For example, for preferred subscribers, route selection function 120 may (e.g. always) select a non-congested or less (e.g. least) congested mobile network route. In some implementations, route selection function 120 may perform a load balancing function in the selection of one of the mobile network routes 150a based on the one or more loading or congestion indication values.

In some alternative implementations of the present disclosure, the one or more indication values may be or include one or more performance indication values indicative of an actual performance of data communications over the one or more mobile network routes 150a. In some of these implementations, the one or more performance indication values may be or include one or more (e.g. discrete) performance status indicators indicative of the actual performance of data communications via the one or more network routes 150a. For example, a status indicator may indicate "0" for GOOD performance, and "1" for POOR performance. As another example, a performance status indicator may indicate "0" for POOR performance, "1" for AVERAGE performance, and "2" for VERY GOOD performance. Here, route selection function 120 may obtain from evaluation function 122 one or more performance status indicators and select one of the mobile network routes 150a based on the obtained one or more performance status indicators.

In such alternative implementations, a performance status indicator may be determined by evaluation function 122 based on one or more current, actual performance parameters of data communications via the one or more mobile network routes 150a. Such a performance parameter may be any suitable performance parameter, such as a packet loss parameter, a latency parameter, a jitter parameter, etc. Here, evaluation function 122 may be configured to obtain one or more actual performance parameters indicative of the actual performance of data communications via one or more mobile network routes 150a, and determine one or more performance status indicators corresponding to such actual performance based on the one or more actual performance parameters. For example, evaluation function 122 may receive/obtain a performance parameter, compare the performance parameter with one or more threshold values, and determine/select one of the performance status indicators (e.g. NORMAL or GOOD performance) based on the outcome of the comparison. In alternative implementations, the one or more performance indication values obtained by route selection function 120 may be or include one or more of the actual performance parameters themselves (e.g. a packet loss parameter, a latency parameter, a jitter parameter etc.) or a derivation of one or more of the actual raw node parameters (e.g. a calculated parameter based on both packet loss and latency parameters).

FIGS. 3A, 3B, and 3C are illustrative diagrams of route selection function 120 operative in connection with a few different implementations of evaluation function 122 according to the present disclosure.

As indicated in FIGS. 3A, 3B, and 3C, route selection function 120 may be configured to send to evaluation function 122 a message which indicates a request to receive loading or congestion indication values and, in response, receive from evaluation function 122 one or more messages which include the one or more loading or congestion indication values (e.g. status indicators). In some implementations, loading or congestion indication values may be pushed from evaluation function 122 to route selection function. For example, a publish-subscribe mechanism may be used for evaluation function 122 to send loading or congestion indication values to route selection function 120, whether on a regular or periodic basis, or in response to identifying notable changes or updates.

In the implementation of FIG. 3A, it is indicated that one or more network nodes 202a perform processing associated with subscriber data calls 302 of the general subscriber population. Evaluation function 122 may be configured to evaluate and determine a loading or congestion at one or more network nodes 202a along the mobile network routes which are loaded by the subscriber data calls 302 (e.g. as a function of the number and type of calls and processing associated therewith etc.).

In the implementation of FIG. 3B, it is indicated that one or more network nodes 202a perform processing associated with test data calls 304 which may be (e.g. regularly or periodically) made by a test call generator 306 (e.g. provided at the evaluation function 122). Evaluation function 122 may be configured to evaluate and determine a loading or congestion at one or more network nodes 202a based on one or more loading or congestion indication values associated with test data calls 304, or alternatively an actual performance of data communications along the mobile network routes based on one or performance indication values associated with the test data calls 304.

In the implementation of FIG. 3C, evaluation function 122 is configured to evaluate and determine a loading or congestion at one or more network nodes along a mobile network route (and/or evaluate and determine an actual performance of data communications via the mobile network route) based on data included and/or derived from one or more probe responses 314. The one or more probe responses 314 may be received at a probe interface 310 in response to one or more probes 312 being communicated to the one or more network nodes 202a. The probe responses 314 may include raw parameters, such as round trip time, latency, and jitter. In some implementations, a summary parameter may be calculated or derived based on a plurality of parameters associated with a plurality of probe responses 314. For example, a summary parameter be calculated or derived based on an aggregate, a sum, or an average of a plurality of parameters from a plurality of probe responses 314 associated with a plurality of probes 312.

Figure 4A:
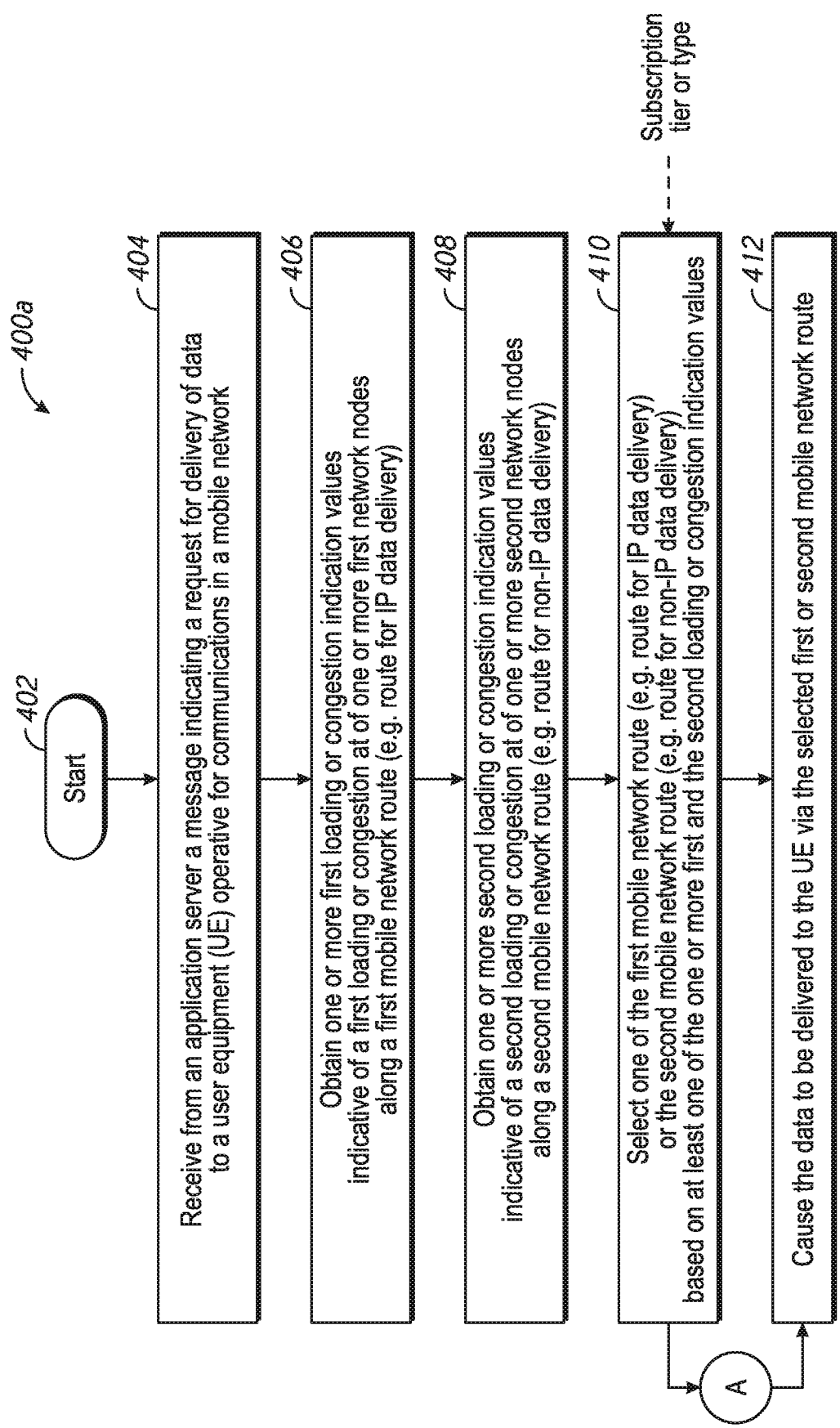
FIGS. 4A-4B and 5 are flowcharts for describing methods for use in selecting a mobile network route for data communications between an AS and a UE (e.g. an IoT device, such as a CAT-M1 device)

FIG. 4A is a flowchart 400a for describing a method for use in selecting a mobile network route for data communications in a mobile network, which is suitable for use in data communications involving user equipment (UE) such as Internet of Things (IoT) devices. The method of FIG. 4A may make use of the entities, components, techniques and concepts described previously in relation to FIGS. 1A-1B, 2A-2B, and 3A-3C. The method of FIG. 4A may be performed by a network entity or function (e.g. NF) in the mobile network, and more specifically may be performed for each one of a plurality of UEs (e.g. IoT devices) operative for data communications in the mobile network. The network entity according to some implementations of the present disclosure may include one or more processors, a memory coupled to the one or more processors, and program instructions stored in the memory and executable by the one or more processors in accordance with the described functionality. A computer program product according to some implementations of the present disclosure may include a non-transitory computer-readable medium and program instructions stored in the non-transitory computer-readable medium, where the program instructions are executable by one or more processors of a network entity of a mobile network in accordance with the described functionality.

Beginning at a start block 402 of FIG. 4A, the network entity of the mobile network may receive from an application server a message indicating a request for delivery of data to a UE which is operative for data communications in the mobile network (step 404 of FIG. 4A). The network entity may obtain one or more first loading or congestion indication values indicative of a first loading or congestion at one or more first network nodes along a first mobile network route (step 406 of FIG. 4A). The network entity may obtain one or more second loading or congestion indication values indicative of a second loading or congestion at one or more second network nodes along a second mobile network route (step 408 of FIG. 4A). In some implementations, the first and/or the second loading or congestion indication values may be loading or congestion status indicators (e.g. NORMAL or HIGH loading or congestion). The network entity may select one of the first or the second mobile network route based on at least one of the one or more first and the second loading or congestion indication values (step 410 of FIG. 4A). The network entity may cause the data to be delivered to the UE via the selected one of the first or the second mobile network route (step 412 of FIG. 4A).

In some implementations of step 410, one of the first or the second mobile network routes may be selected based on the one or more loading or congestion indication values as well as a subscription tier or type associated with the UE (e.g. priority or non-priority subscription or subscriber). In some implementations, one of the first or the second mobile network routes may be selected according to a load balancing function with consideration of the one or more loading or congestion indication values.

Figure 4B:
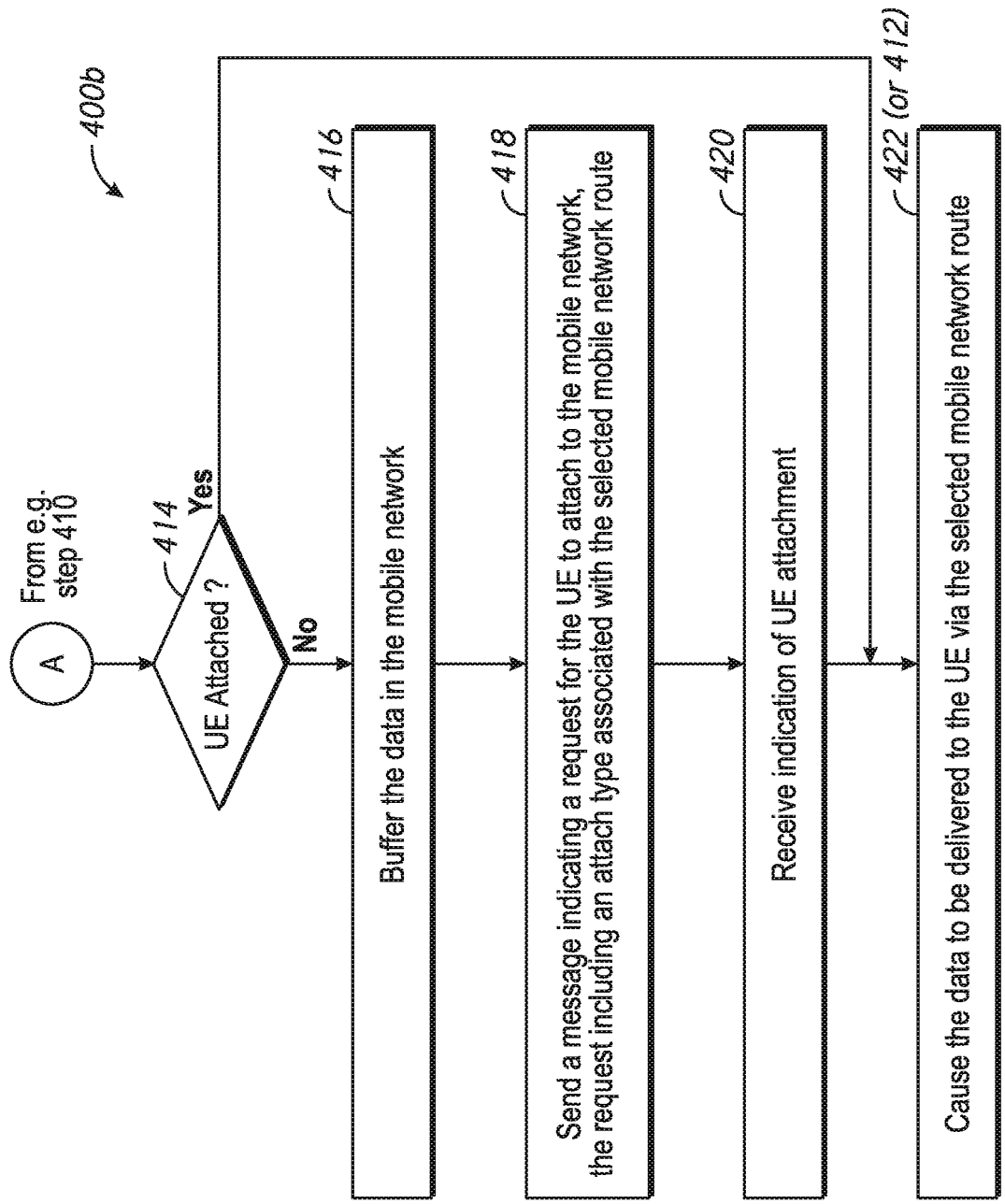

FIG. 4B is a flowchart 400b for describing a method for use in selecting a mobile network route for data communications in a mobile network, which is suitable for use in data communications involving UEs such as IoT devices. The method of FIG. 4B may be performed after the network entity performs a selection of a mobile network route for data communications in FIG. 4A, for example, after step 410 of FIG. 4A via a connector A.

Beginning from the connector A in FIG. 4B, the network entity may identify whether the UE is currently attached to the mobile network (step 414 of FIG. 4B). If the UE is currently attached to the mobile network as identified in step 414, the network entity may cause the data to be delivered to the UE via a selected mobile network route associated the UE attachment (step 422 of FIG. 4B) (which corresponds to step 412 of FIG. 4A). If the UE is not currently attached to the mobile network as identified in step 414 (e.g. the device is in a low power mode of operation), the network entity may cause the incoming data to be buffered in the mobile network (step 416 of FIG. 4B). In some implementations, the buffering of the data may take place at the network entity itself. The network entity may construct and send a message indicating a request for the UE to attach to the mobile network (step 418 of FIG. 4B). The request may include an attach type associated with the selected mobile network route. In some implementations, the message of step 418 may be an SMS message. Subsequently, the network entity may receive an indication or notification that the UE is attached to the mobile network (step 420 of FIG. 4B). In response to receiving the indication or notification, the network entity may cause the data to be delivered to the UE via a selected mobile network route associated the UE attachment (step 422 of FIG. 4B).

Figure 5:
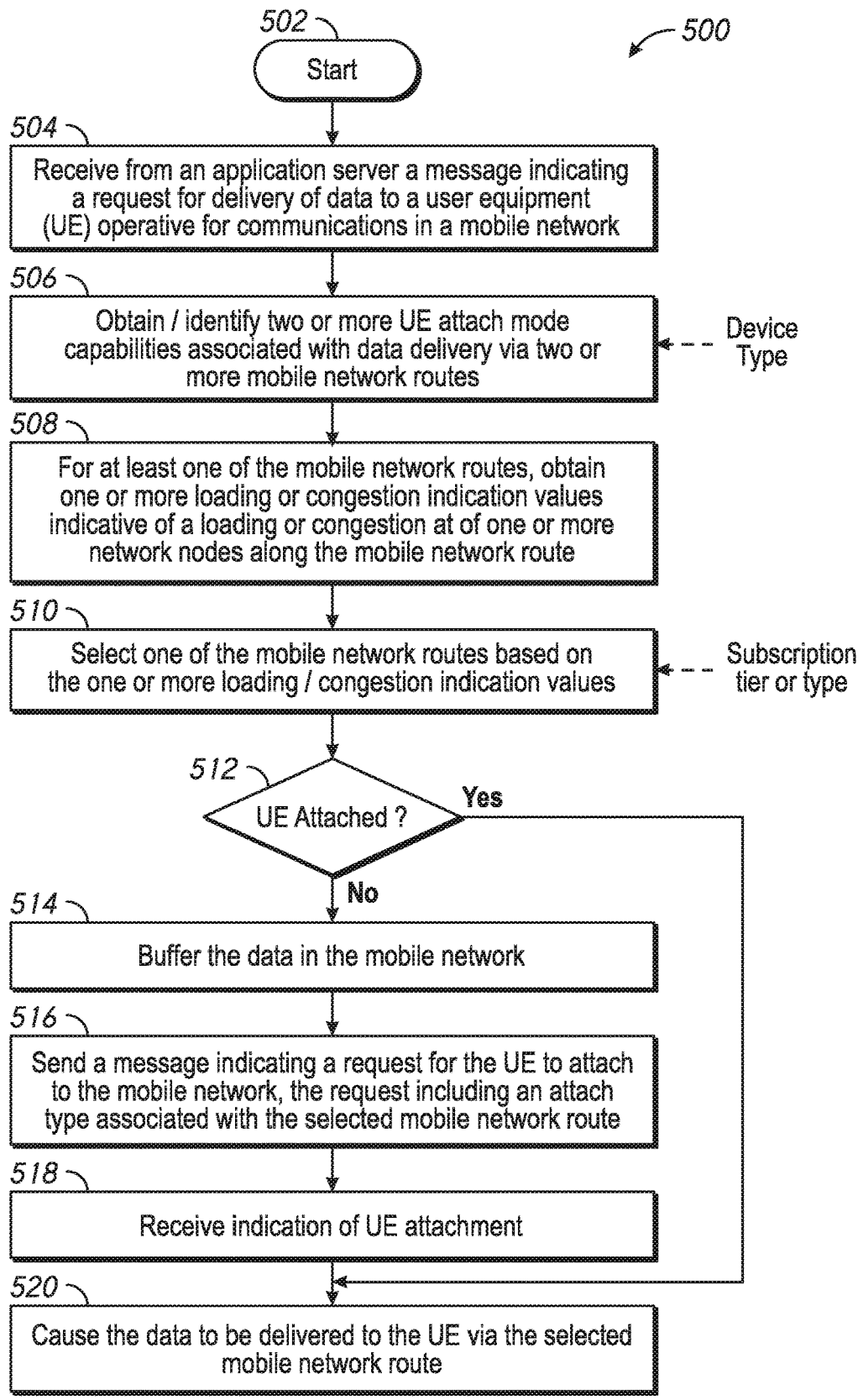

FIG. 5 is a flowchart 500 for describing a method for use in selecting a mobile network route for data communications in a mobile network, which is suitable for use in data communications involving UEs such as IoT devices. The method of FIG. 5 may make use of the entities, components, techniques and concepts described previously in relation to FIGS. 1A-1B, 2A-2B, and 3A-3C. The method of FIG. 5 may be performed by a network entity or function in the mobile network, and more specifically may be performed for each one of a plurality of UEs (e.g. IoT devices) operative for data communications in the mobile network, as well as for each one of a plurality of application servers. The network entity according to some implementations of the present disclosure may include one or more processors, a memory coupled to the one or more processors, and program instructions stored in the memory and executable by the one or more processors in accordance with the described functionality. A computer program product according to some implementations of the present disclosure may include a non-transitory computer-readable medium and program instructions stored in the non-transitory computer-readable medium, where the program instructions are executable by one or more processors of a network entity of a mobile network in accordance with the described functionality.

Beginning at a start block 502 of FIG. 5, the network entity of the mobile network may receive from an application server a message indicating a request for delivery of data to a UE which is operative for data communications in the mobile network (step 504 of FIG. 5). The network entity may obtain and/or identify two or more UE attach mode type capabilities of the UE (step 506 of FIG. 5). The two or more UE attach mode type capabilities may be associated with data delivery via two or more mobile network routes in the mobile network. In some implementations, the two or more UE attach mode capabilities may be indicated in a stored profile associated with the UE, and/or may be indicated or determined from a device type which is included in the stored profile.

As an illustrative example, a UE may have one or more attach mode capabilities which include an IP attach mode capability, a non-IP attach mode capability, and an SMS attach mode capability. On one hand, a UE having a device type indicative of a CAT-M1 device may indicate an IP attach mode capability, a non-IP attach mode capability, and an SMS attach mode capability. On the other hand, a UE having a device type indicative of a NB IoT device may indicate a non-IP attach mode capability and an SMS attach mode capability.

For at least one of the mobile network routes associated with the identified UE attach mode capabilities, the mobile entity may obtain one or more loading or congestion indication values indicative of a loading or congestion of one or more network nodes along the mobile network route (step 508 of FIG. 5). In some implementations, the one or more loading or congestion indication values may be loading or congestion status indictors (e.g. NORMAL or HIGH loading or congestion). The network entity may select one of the mobile network routes based on the obtained one or more loading or congestion indication values (step 510 of FIG. 5). The network entity may identity whether the UE is currently attached to the mobile network (step 512 of FIG. 5). If the UE is currently attached to the mobile network as identified in step 512, the network entity may cause the data to be delivered to the UE via a selected mobile network route associated the UE attachment (step 520 of FIG. 5).

If the UE is not currently attached to the mobile network as identified in step 512 (e.g. the device is in a low power mode of operation), the network entity may cause the incoming data to be buffered in the mobile network (step 514 of FIG. 5). In some implementations, the buffering of the data may take place at the network entity itself (e.g. at an SCEF of a 4G/LTE/EPC network, or an NEF of a 5G mobile network). In addition, the network entity may construct and send a message indicating a request for the UE to attach to the mobile network (step 516 of FIG. 5). The request may include an attach type associated with the selected mobile network route. In some implementations, the message of step 516 may be an SMS message. Subsequently, the network entity may receive an indication or notification that the UE is attached to the mobile network (step 518 of FIG. 5). In response to the indication or notification, the network entity may cause the data to be delivered to the UE via the selected mobile network route associated the UE attachment (step 520 of FIG. 5).

In some implementations of step 510, one of the mobile network routes may be selected based on the one or more loading or congestion indication values as well as a subscription tier or type associated with the UE (e.g. priority or non-priority subscription or subscriber). In some implementations, one of the mobile network routes may be selected according to a load balancing function with consideration of the one or more loading or congestion indication values.

Table 1 below is a route selection decision table which provides a simple illustrative example of route selection decision-making for a route selection function. In the example shown, route selection between two different routes (i.e. route 1 or route 2) may be based on loading or congestion (NORMAL or HIGH loading/congestion) and subscriber tier or type (e.g. NORMAL subscriber/subscription or PRIORITY subscriber/subscription). As indicated, when route 1 has NORMAL loading/congestion and route 2 has HIGH loading/congestion, route 1 may be selected for a PRIORITY subscriber/subscription whereas route 2 may be selected for a NORMAL subscriber/subscription. When route 2 has NORMAL loading/congestion and route 1 has HIGH loading/congestion, route 2 may be selected for a PRIORITY subscriber/subscription whereas route 1 may be selected for a NORMAL subscriber/subscription. When route 1 and route 2 have the same loading/congestion status (i.e. both are NORMAL loading/congestion or both are HIGH loading/congestion), then the route may be selected according to a load balancing function.

TABLE 1

Example route selection decision table based on loading/congestion and subscriber tier or type.

| Route 1 | Route 2 | Route Selection Decision |
|---|---|---|
| NORMAL loading/ congestion | NORMAL loading/ congestion | Select route 1 or 2 according to load balancing function |
| NORMAL loading/ congestion | HIGH loading/ congestion | PRIORITY subscriber = route 1 NORMAL subscriber = route 2 |
| HIGH loading/ congestion | NORMAL loading/ congestion | PRIORITY subscriber = route 2 NORMAL subscriber = route 1 |
| HIGH loading/ congestion | HIGH loading/ congestion | Select route 1 or 2 according to load balancing function |

Although the techniques of FIGS. 4A, 4B, and 5 were described with use of two different mobile network routes (e.g. for IP data delivery and non-IP data delivery), the techniques may be similarly applied with use of three or more different mobile network routes (e.g. for IP data delivery, non-IP data delivery, and SMS data delivery). Further, although the techniques of FIGS. 4A, 4B, and 5 were described in relation to use of loading or congestion indication values indicative of loading or congestion, the techniques may be similarly applied using performance indication values indicative of an actual performance of data communications as described earlier above.

Figure 6:
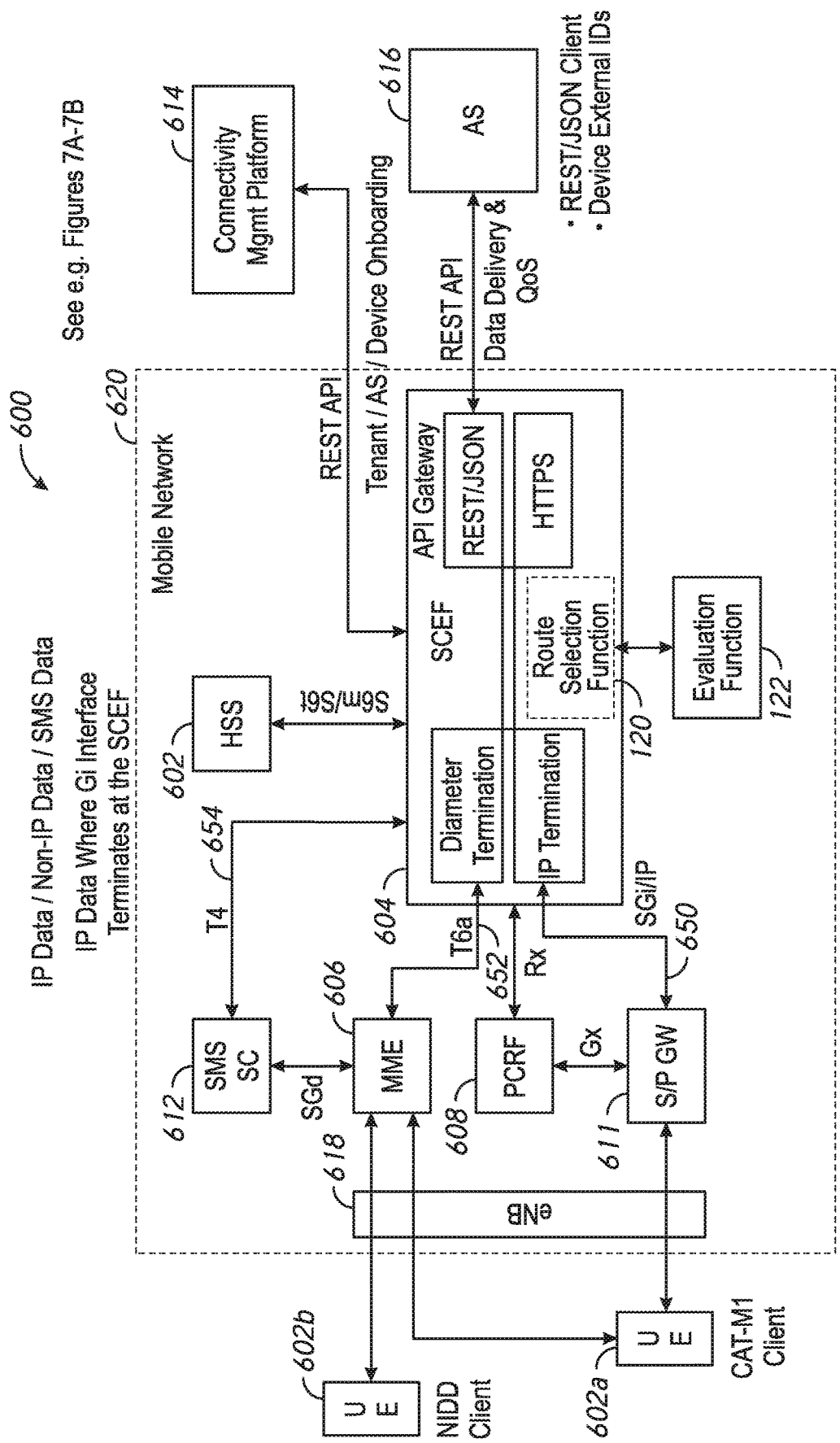
FIG. 6 is an illustration of a network architecture of a fourth generation 4G), long term evolution (LTE), evolved packet core (EPC) network which may incorporate methods and apparatus of the present disclosure.

FIG. 6 is an illustrative representation of a communication system 600 which includes a 4G/LTE/EPC mobile network 620 which may incorporate methods and apparatus of the present disclosure. Mobile network 650 may include a home subscriber server (HSS) 602, a service capability exposure function (SCEF) 604, a mobility management entity (MME) 606, a policy and charging rules function (PCRF) 608, a serving/packet (S/P) gateway (GW) 611, and a short messaging service (SMS) service center (SC) (SMS-SC) 612. Also included in network architecture 600 is a connectivity management platform 614. Route selection function 120 is included as part of SCEF 604 and is configured to communicate with evaluation function 122.

UEs, which include a UE 602a (a CAT-MI device) and a UE 602b (a NB IoT device), may connect or attach to mobile network 650 for communications via a base station or eNodeB (eNB) 618. An application server (AS) 616 may communicate data to an/or from UEs 602a and/or 602b via mobile network 650. In the network architecture 600 of FIG. 6, a first mobile network route for data communications makes use of a SGi interface 650 which terminates at SCEF 650 for IP data delivery, a second mobile network route for data communications makes use of a T6a interface 652 for NIDD, and a third mobile network route for data communications makes use of a T4 interface 654 for SMS data delivery. The entities in network architecture 500a may be interfaced and connected as further indicated by the interfaces and components in FIG. 6.

General handling and processing associated with UEs 602a and 602b CAT-M1 devices or NB-IoT devices are now briefly discussed. CAT-M1 devices are configured to support IP data delivery for wideband (WB) data communications, NIDD for narrowband (NB) data communications, and SMS data delivery. SCEF 604 may become aware when a CAT-M1 device connects to mobile network 620 via the PCRF 608/SCEF 604 interface. At this time, SCEF 604 may create a context for the CAT-M1 device which includes its IP address as an identity. For mobile-terminated (MT) data to be delivered to the CAT-M1 device, given the creation of the UE context, SCEF 604 may send the MT data from AS 616 to the CAT-M1 device over the SGi interface 650 via S/P-GW 611. Based on the above, AS 616 is not aware how the MT data is delivered (i.e. whether over the SGi interface 60 for IP data, the T6a interface 652 for non-IP data/NIDD, or the T4 interface 654 or SMS data delivery).

On the other hand, Narrow Band IoT (NB-IoT) is a Low Power Wide Area Network (LPWAN) radio technology standard developed to enable a wide range of devices and services to be connected using cellular telecommunications bands. An NB IoT device is a constrained device that does not support IP. NB IoT devices are configured to support NIDD for narrowband (NB) data communications and SMS data delivery. For NIDD, AS 616 may initiate a procedure that triggers an NIDD configuration procedure between SCEF 604 and HSS 602. As a result of the procedure, an HSS record of the NB-IoT device indicates that SCEF 604 will handle the connection to the access point name (APN). This information is sent to MME 606 as part of the UE attach procedure. The MME initiates the T6a session establishment to the SCEF. Mobile terminated (MT) data for the NB-IoT device may be sent over the T6a interface 652 to the MME 606 based on a UE context (and/or session record) which is created when the T6a session establishment is performed.

Figure 7A:
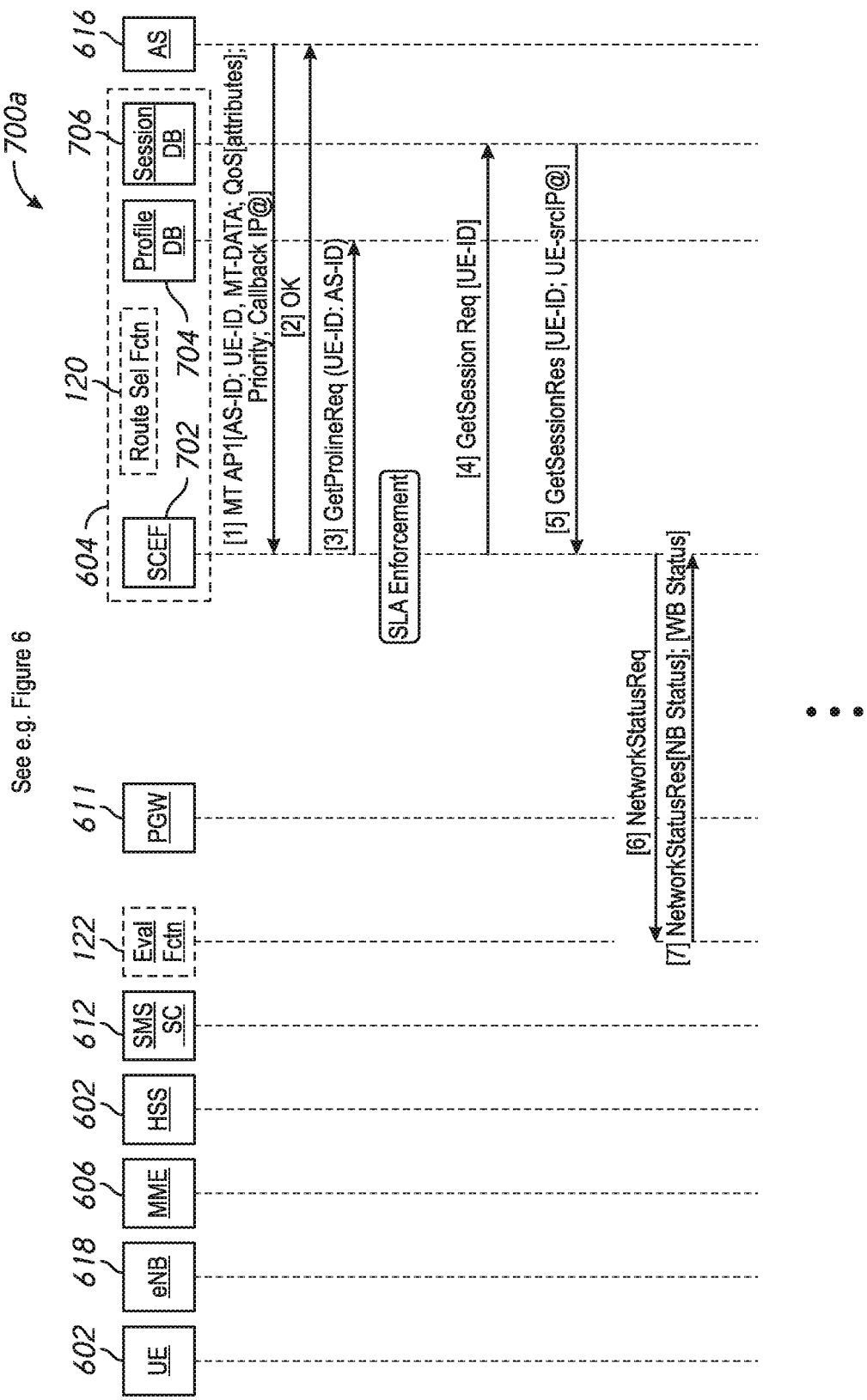
FIGS. 7A-7B are message flow diagrams of a message flow of a technique for use in selecting a mobile network route for data communications between an AS and a UE (e.g. an IoT device, such as a CAT-M1 device), with use of the network architecture described in relation to FIG. 6.
Figure 7B:
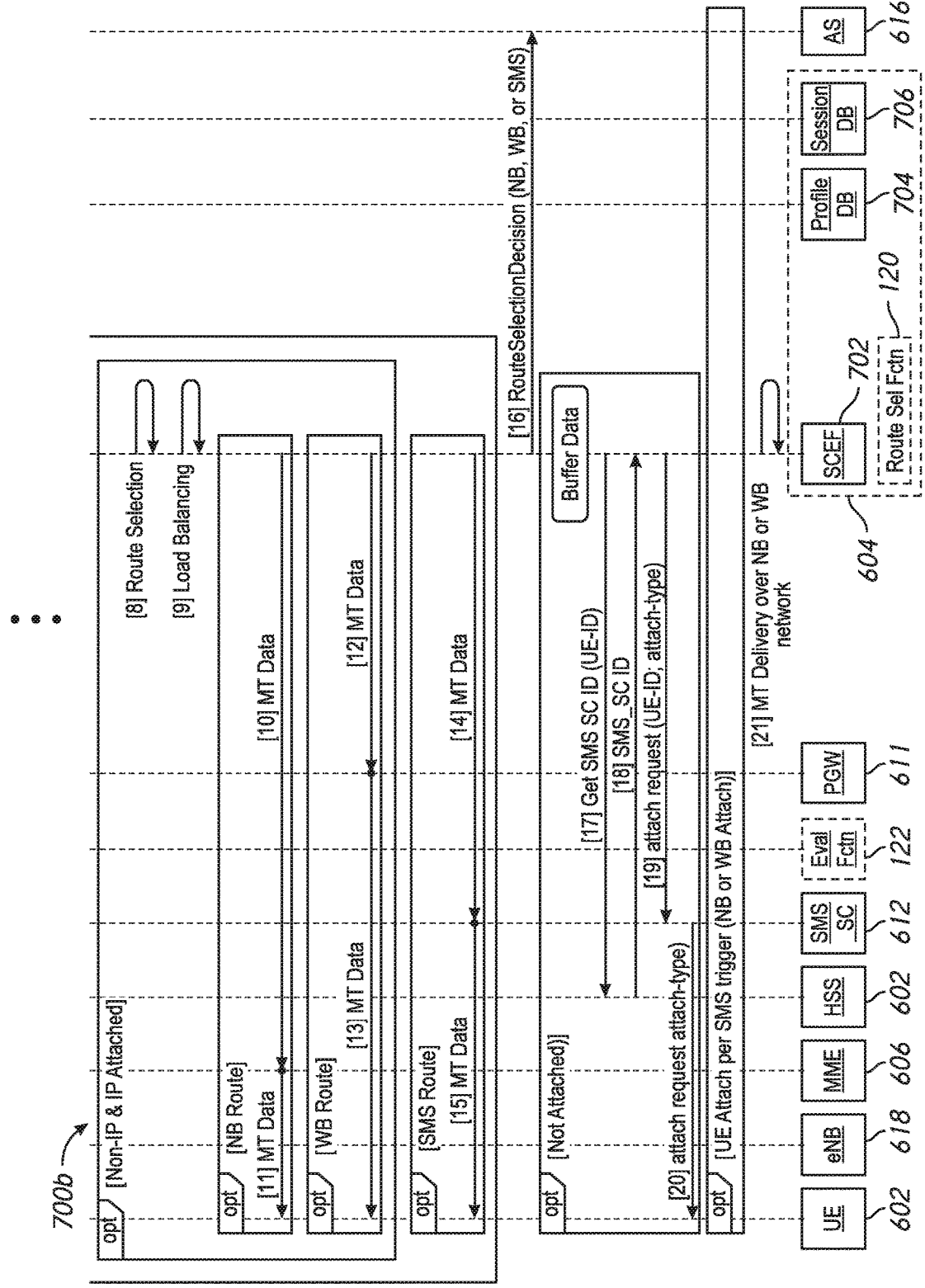

FIGS. 7A-7B are message flow diagrams 700a and 700b of a message flow of a technique for use in selecting a mobile network route for data communications between an AS and a UE (e.g. an IoT device, such as a CAT-M1 device), with use of the network architecture described in relation to FIG. 6. The technique described may make use of any of the implementations described above in relation to FIGS. 1-5. As illustrated in FIGS. 7A-7B, SCEF 604 may include an SCEF processor 702, a profile database (DB) 704, and a session DB 706.

To begin in FIG. 7A, AS 616 may send a mobile-terminated (MT) data API call or message to SCEF processor 702 of SCEF 604 (step 1 of FIG. 7A). The MT data API message or call may include an identifier of AS 616 (e.g. AS-ID), an identifier of UE 602 (e.g. an IMSI or other), the MT data or an identifier thereof, quality of service (QoS) attributes for the connection/delivery, a priority indication (e.g. High, Normal, or Low priority) and a callback IP address. SCEF 604 may receive the MT data API call and, in response, send an OK or acknowledgement message to AS 616 (step 2 of FIG. 7A). SCEF processor 702 of SCEF 604 may send to profile DB 704 a get profile request for obtaining a profile (e.g. a subscription or device profile) associated with UE 602, where the request may include an identifier of UE 602 (e.g. UE-ID) and an identifier of AS 616 (e.g. AS-ID) (step 3 of FIG. 7A). SCEF processor 702 of SCEF 604 may then perform service level agreement (SLA) enforcement. SCEF processor 702 of SCEF 604 may send to session DB 706 a message which includes a get profile request (step 4 of FIG. 7A). The request may include an identifier of UE 602 (e.g. UE-ID). Session DB 706 may receive the request and, in response, send back to SCEF processor 702 a get session response (step 5 of FIG. 7A). This response may include the identifier of UE 520a (e.g. UE-ID) and a source IP address of UE 602 (e.g. UE-srcIP@) for data delivery.

SCEF processor 702 of SCEF 604 may send to evaluation function 122 a message which includes a network status request (step 6 of FIG. 7A). Evaluation function 122 may receive the message and, in response, send to SCEF 604 a network status response (step 7 of FIG. FIG. 7A). The network status response may include an NB status (i.e. for NIDD) and a WB status (i.e. for IP data delivery). The network status response of step 7 may be or include one or more indication values (e.g. one or more status indicators). See e.g. the description in relation to the above figures.

Referring now to FIG. 7B, SCEF processor 702 of SCEF 604 may select one of the mobile network routes for data communications based on the received network status response (which includes one or more indication values) from evaluation function (step 8 of FIG. 7A). The selection maybe performed with use of any of the techniques and considerations described in relation to the above figures. SCEF processor 702 of SCEF 604 may alternatively or additional select one of the mobile network routes for data communications based on a load balancing function (step 9 of FIG. 7A).

In a first case, UE 602 is identified to be already attached to the mobile network for IP data delivery and already attached to the mobile network for NIDD. When the selected mobile network route is for NIDD, SCEF processor 702 of SCEF 604 may cause the data to be sent to MME 606 via the T6a interface (step 10 of FIG. 7A) for delivery (i.e. NIDD) to UE 602 (step 11 of FIG. 7A). When the selected mobile network route is for IP data delivery, SCEF processor 702 of SCEF 604 may cause the data to be sent to S/P-GW 611 (step 12 of FIG. 7A) via the SGi interface for IP data delivery to UE 602 (step 13 of FIG. 7A). When the selected mobile network route is for SMS data delivery, SCEF processor 702 of SCEF 604 may cause the data to be sent to SMS-SC 612 (step 14 of FIG. 7A) via the T4 interface for SMS data delivery to UE 602 (step 15 of FIG. 7A). SCEF processor 702 of SCEF 604 may send to AS 616 a message which includes an indication of the route selection decision (step 16 of FIG. 7A).

In a second case, UE 602 is identified as not being attached to the mobile network for IP data delivery and not being attached to the mobile network for NIDD. Here, SCEF 604 may buffer the incoming data from AS 616. SCEF 604 may send to HSS 602 a message which includes a request to get an SMS-SC ID of SMS-SC 612 (step 17 of FIG. 7B) and, in response, may receive from HSS 602 a message which includes a response having the obtained SMS-SC ID of SMS-SC 612 (step 18 of FIG. 7 B). SCEF processor 702 of SCEF 604 may send to SMS-SC 612 a message which includes an attach request, where the attach request includes an identifier of UE 602 (e.g. UE-ID) and an attach type (e.g. for IP data delivery or NIDD) associated with the selected mobile network route (step 19 of FIG. 7A). In turn, SMS-SC 612 may send to UE 602 an SMS message which includes the attach request indicating the selected attach type (step 20 of FIG. 7A). In response, UE 602 may attach to the mobile network in accordance with the received, selected attach type (e.g. IP data delivery or NIDD) and thereafter the data may be delivered to UE 602 in the same manner as in steps 10 and 11 (for NIDD) or steps 12 and 13 (for IP data delivery).

Figure 8:
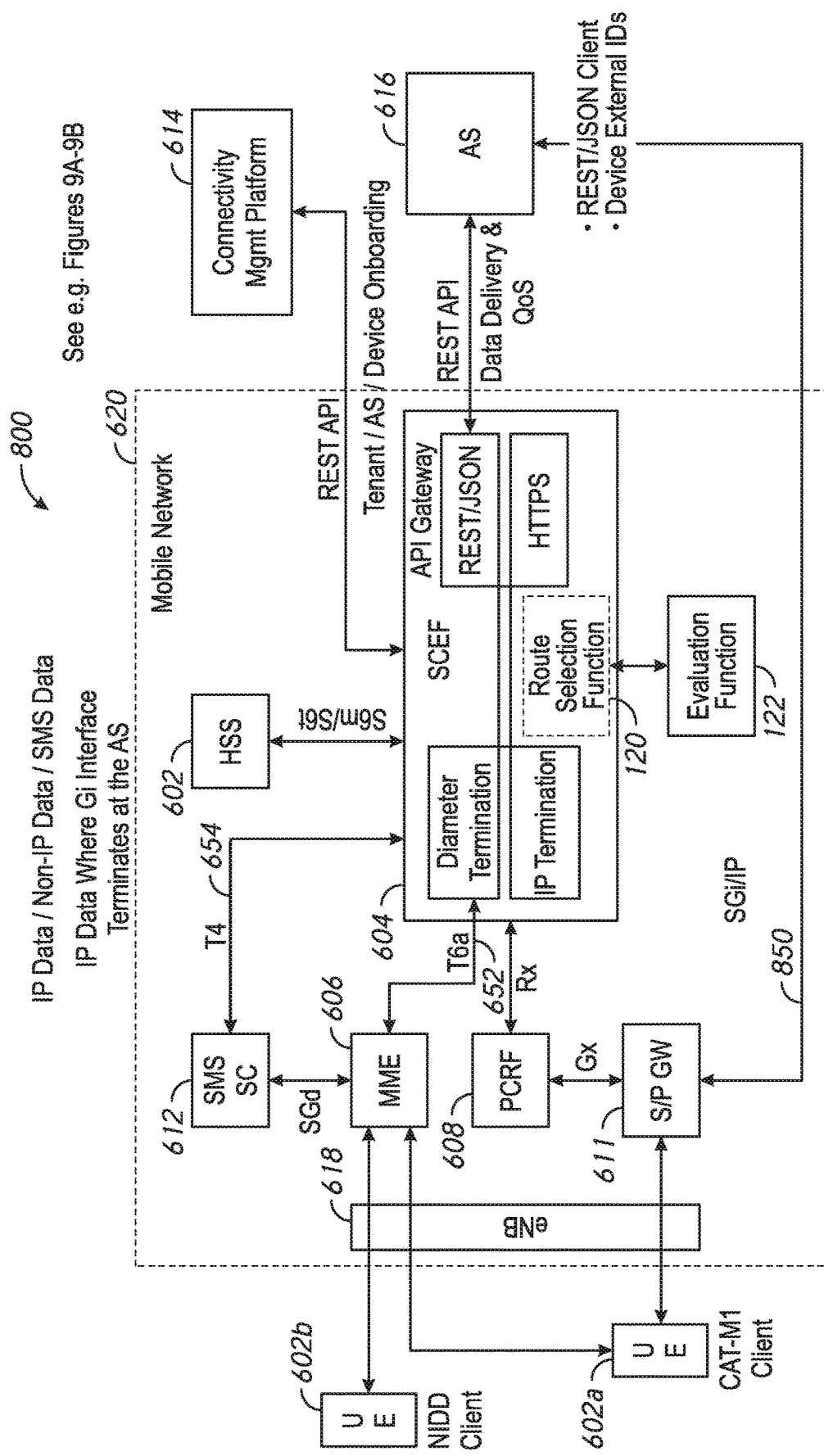
FIG. 8 is an illustration of a network architecture of a 4G, LTE, EPC network which may incorporate methods and apparatus of the present disclosure.

FIG. 8 is an illustration of a communication system 800 which includes the 4G/LTE/EPC mobile network which may incorporate methods and apparatus of the present disclosure. In FIG. 8, mobile network 620 is substantially the same as mobile network 620 of FIG. 6, except that an SGi interface 850 is shown to terminate at the AS 616 for the IP data delivery.

Figure 9A:
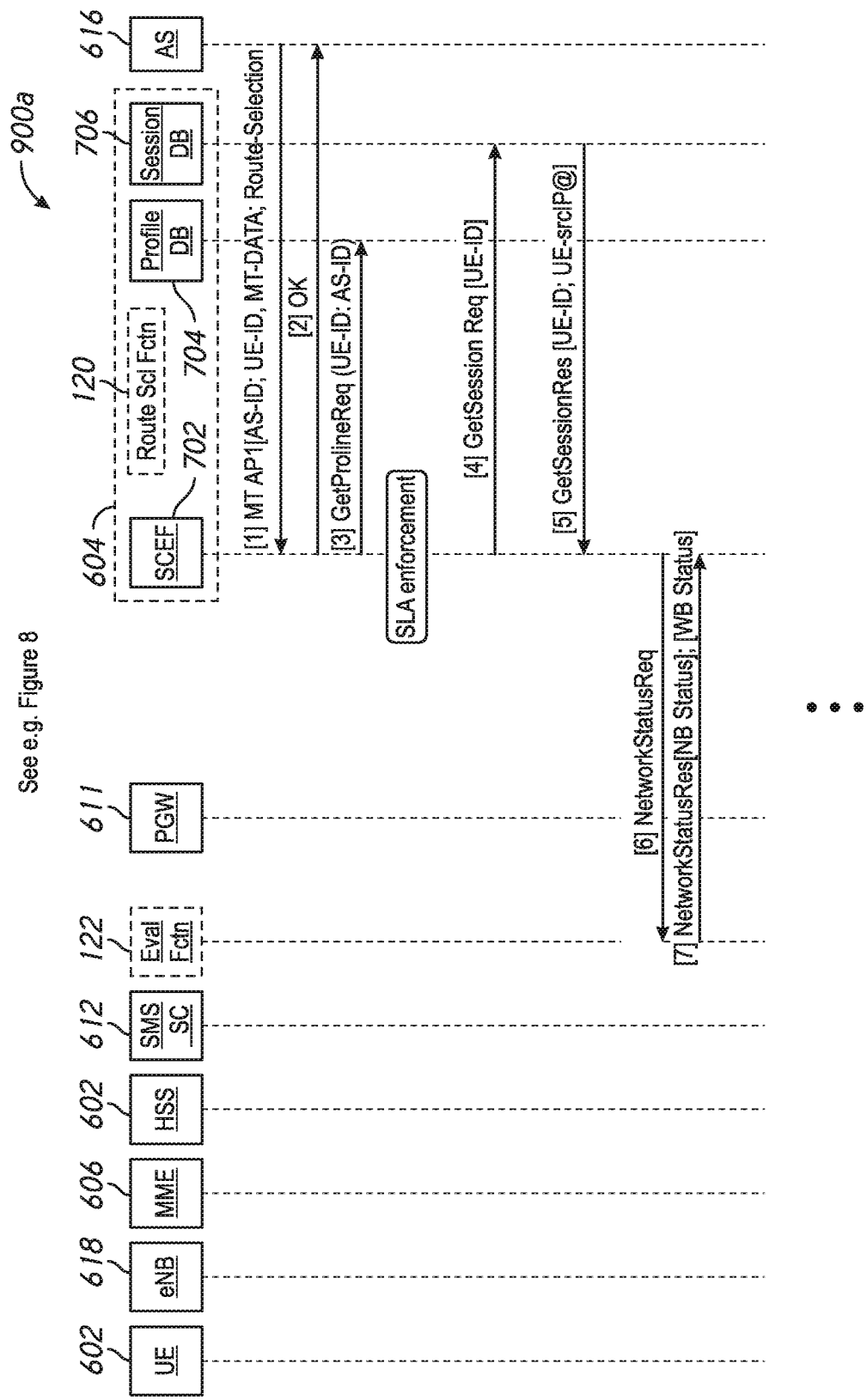
FIGS. 9A-9B are message flow diagrams of a message flow of a technique for use in selecting a mobile network route for data communications between an AS and a UE (e.g. an IoT device, such as a CAT-M1 device), with use of the network architecture described in relation to FIG. 6.
Figure 9B:
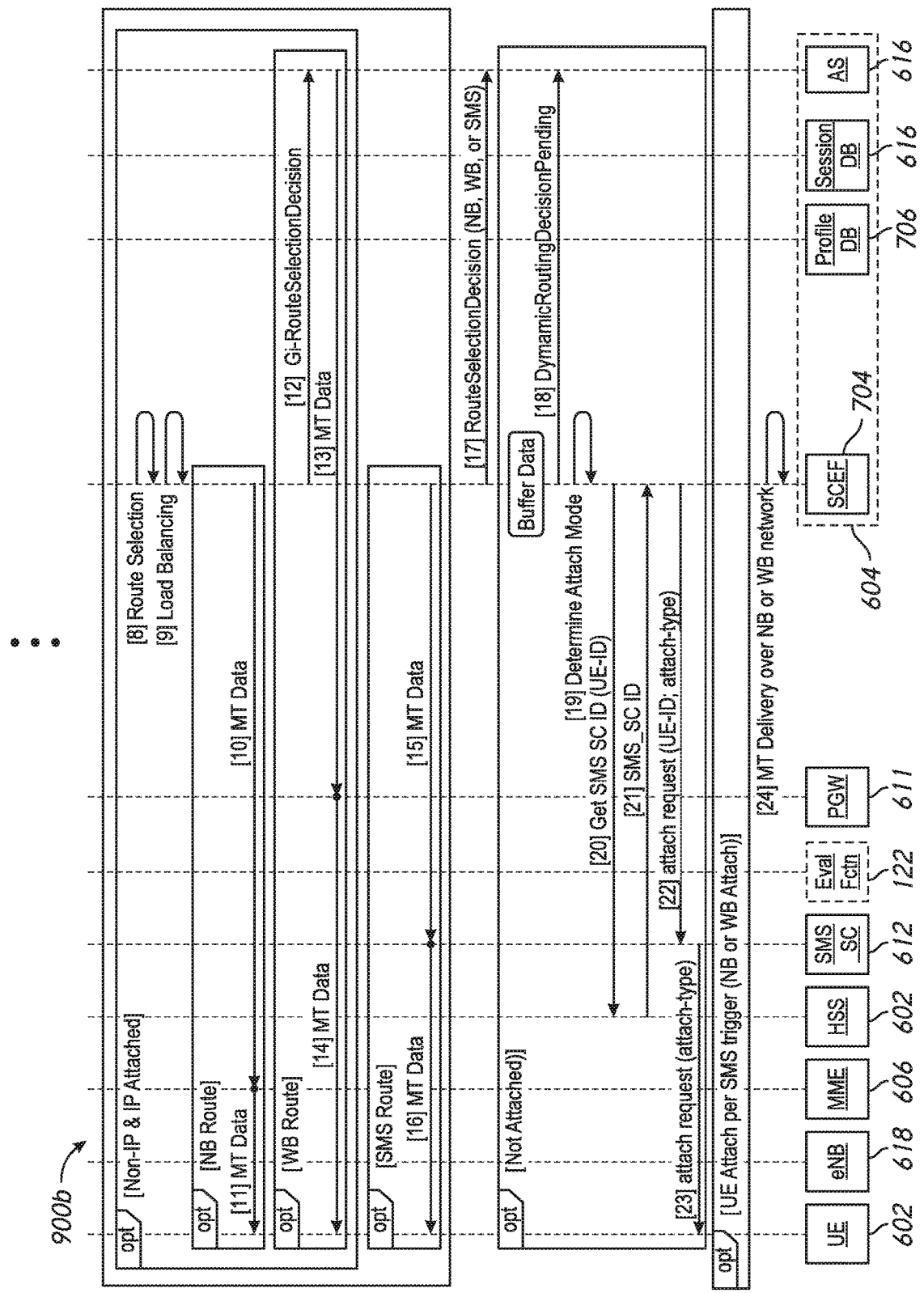

FIGS. 9A-9B are message flow diagrams 900a and 900b of a message flow of a technique for use in selecting a mobile network route for data communications between an AS and a UE (e.g. an IoT device, such as a CAT-M1 device), with use of the network architecture 800 described in relation to FIG. 8. The technique may make use of any of the implementations described above in relation to FIGS. 1-5.

To begin in FIG. 9A, AS 616 may send a mobile-terminated (MT) data API call or message to SCEF processor 702 of SCEF 604 (step 1 of FIG. 9A). The MT data API message or call may include an identifier of AS 616 (e.g. AS-ID), an identifier of UE 602 (e.g. an IMSI or other), the MT data or an identifier thereof, and a route selection indication. SCEF 604 may receive the MT data API call and, in response, send an OK or acknowledgement message to AS 616 (step 2 of FIG. 9A). SCEF processor 702 of SCEF 604 may send to profile DB 704 a get profile request for obtaining a profile (e.g. a subscription or device profile) associated with UE 602, where the request may include an identifier of UE 602 (e.g. UE-ID) and an identifier of AS 616 (e.g. AS-ID) (step 3 of FIG. 9A). SCEF processor 702 of SCEF 604 may then perform service level agreement (SLA) enforcement. SCEF processor 702 of SCEF 604 may send to session DB 706 a message which includes a get profile request (step 4 of FIG. 9A). The request may include an identifier of UE 602 (e.g. UE-ID). Session DB 706 may receive the request and, in response, send back to SCEF processor 702 a get session response (step 5 of FIG. 9A). This response may include the identifier of UE 520a (e.g. UE-ID) and a source IP address of UE 602 (e.g. UE-srcIP@) for data delivery.

SCEF processor 702 of SCEF 604 may send to evaluation function 122 a message which includes a network status request (step 6 of FIG. 9A). Evaluation function 122 may receive the message and, in response, send to SCEF 604 a network status response (step 7 of FIG. FIG. 9A). The network status response may include an NB status (i.e. for NIDD) and a WB status (i.e. for IP data delivery). The network status response may include an NB status (i.e. for NIDD) and a WB status (i.e. for IP data delivery). The network status response of step 7 may be or include one or more indication values (e.g. one or more status indicators). See e.g. the description in relation to the above figures.

Referring now to FIG. 9B, SCEF processor 702 of SCEF 604 may select one of the mobile network routes for data communications based on the received network status response from evaluation function 122 (see again e.g. the description in relation to the above-figures) (step 8 of FIG. 9B). The selection maybe performed with use of any of the considerations described in relation to the above figures). SCEF processor 702 of SCEF 604 may alternatively or additional select one of the mobile network routes for data communications based on a load balancing function (step 9 of FIG. 9B).

In a first case, UE 602 is identified to be already attached to the mobile network for IP data delivery and identified to be already attached to the mobile network for NIDD. When the selected mobile network route is for NIDD, SCEF processor 702 of SCEF 604 causes the data to be sent to MME 606 via the T6a interface (step 10 of FIG. 9A) for delivery (i.e. NIDD) to UE 602 (step 11 of FIG. 9A). When the selected mobile network route is for IP data delivery, SCEF processor 702 of SCEF 604 may send to AS 61 a message which includes an indication of the route selection decision (step 12 of FIG. 9B). Here, the route selection decision is for (or indicates to) AS 616 to communicate for IP data delivery over the SGi interface. In response to receipt of the message, AS 616 may send the data to PGW 611 via the SGi interface (step 13 of FIG. 9B) for delivery (i.e. IP data delivery) to UE 602 (step 14 of FIG. 9B). When the selected mobile network route is for SMS data delivery, SCEF processor 702 of SCEF 604 causes the data to be sent to SMS-SC 612 (step 15 of FIG. 9B) via the T4 interface for SMS data delivery to UE 602 (step 16 of FIG. 9B). SCEF processor 702 of SCEF 604 may send to AS 616 a message which includes an indication of the route selection decision (step 17 of FIG. 9B).

In a second case, UE 602 is identified as not being attached to the mobile network for IP data delivery and not being attached to the mobile network for NIDD. Here, SCEF 604 may buffer the incoming data from AS 616. SCEF 604 may send to AS 616 a message which indicates that a route decision or selection is pending (step 18 of FIG. 9B). If not identified previously, SCEF processor 704 of SCEF 604 may determine or identify the attach mode associated with the selected mobile network route (step 19 of FIG. 9B). SCEF 604 may send to HSS 602 a message which includes a request to get an SMS-SC ID of SMS-SC 612 (step 20 of FIG. 9B) and, in response, may receive from HSS 602 a message which includes a response having the obtained SMS-SC ID of SMS-SC 612 (step 21 of FIG. 9B). SCEF processor 702 of SCEF 604 may send to SMS-SC 612 a message which includes an attach request, where the attach request includes an identifier of UE 602 (e.g. UE-ID) and an attach type (e.g. for IP data delivery or NIDD) associated with the selected mobile network route (step 22 of FIG. 9B). In turn, SMS-SC 612 may send to UE 602 an SMS message which includes the attach request indicating the selected attach type (step 23 of FIG. 9B). In response, UE 602 may attach to the mobile network in accordance with the received, selected attach type (e.g. IP data delivery or NIDD) and thereafter the data may be delivered to UE 602 (step 24 of FIG. 9B). The data may be delivered to UE 602 in the same manner as in steps 10 and 11 (for NIDD) or steps 13 and 14 (for IP data delivery).

In some alternative implementation, mobile-originated (MO) data may be communicated from the UE to the AS in a similar manner as described above. Initially, the UE may or may not be attached to the mobile network. The SCEF (or e.g. other network entity) may receive a message indicating that the UE intends to communicate MO data. At that time, the SCEF may select the appropriate mobile network route and send a message to the UE indicating the selected mobile network route for data delivery. In implementations where the UE is initially not attached to the mobile network, the message received by the SCEF may be a message indicating that the UE has recently attached to the mobile network (e.g. for MO data delivery). In some implementations, the UE may attach to the mobile network for both IP data delivery and NIDD, and deliver the MO data according to the selected mobile network route indicated by the SCEF.

In other implementations for MO data delivery, the UE may attach to the mobile network according to the most preferred or common attach type (e.g. for IP data delivery). Here, the SCEF may select the appropriate mobile network route and identity whether the current UE attachment matches the UE attachment for the selected mobile network route. If not, the SCEF may construct and send a message (e.g. SMS message) indicating a request for the UE to attach to the mobile network according to the selected mobile network route. The UE may then attach to the mobile network according to the identified attach type, and send the MO data via the selected mobile network route.

Figure 10A:
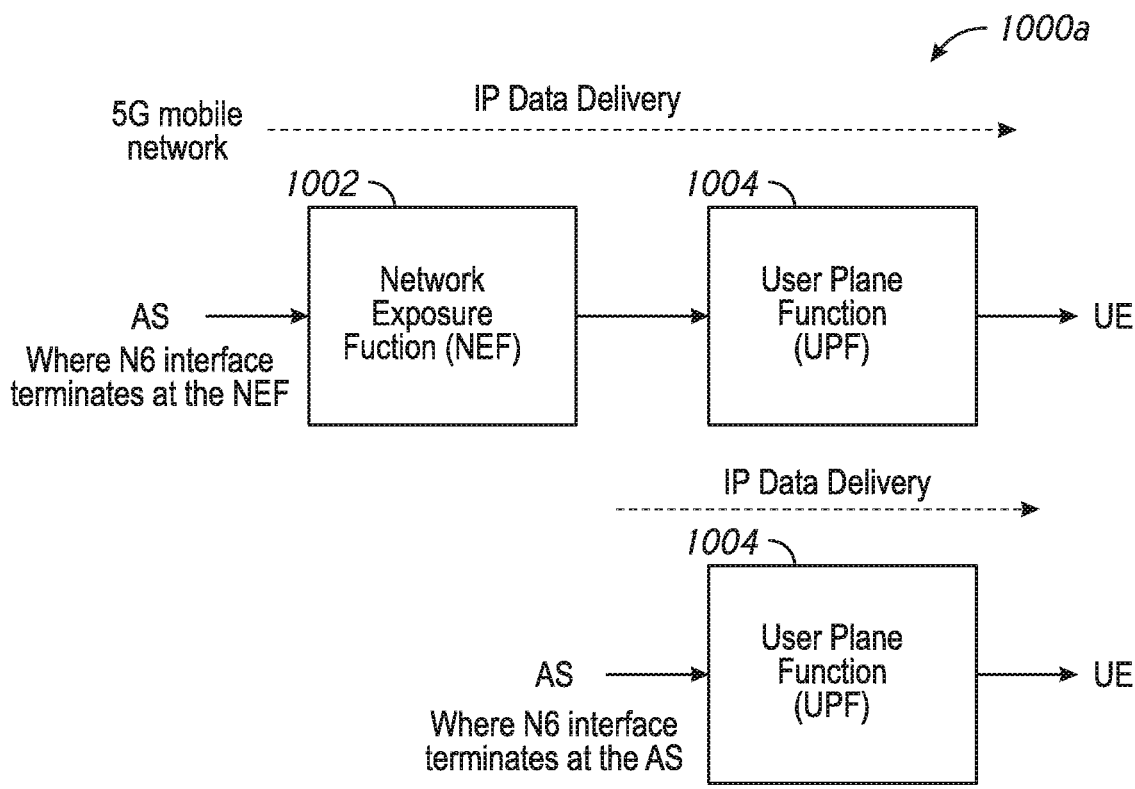
FIGS. 10A-10B are illustrations of a plurality of mobile network routes including one or more network nodes having one or more network functions (NFs) in a mobile network which may be a fifth generation (5G) mobile network.
Figure 10B:
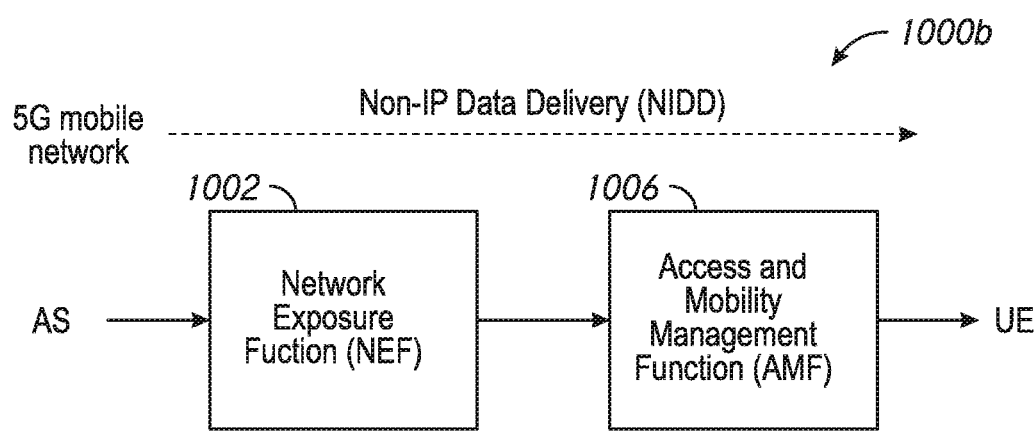

FIGS. 10A-10B are illustrative representations of one or more network nodes having one or more network functions (NFs) provided along a plurality of mobile network routes in a fifth generation (5G) mobile network. In FIG. 10A, a mobile network route for IP data delivery in the 5G mobile network where the N6 interface terminates at the NEF may include a network node having a network exposure function (NEF) 1002 and a network node having a user plane function (UPF) 1006. Alternatively as shown in FIG. 10A, a mobile network route for IP data delivery in the 5G mobile network where the N6 interface terminates at the NEF may include a network node having UPF 1006 and not NEF 1002. In FIG. 10B, a mobile network route for NIDD in the 5G mobile network may include the network node having the NEF 1002 and a network node having an access and mobility management function (AMF) 1006. A route selection function (e.g. of FIGS. 1-5) for selecting one of the mobile network routes may be included in or as part of NEF 1002.

Figure 11:
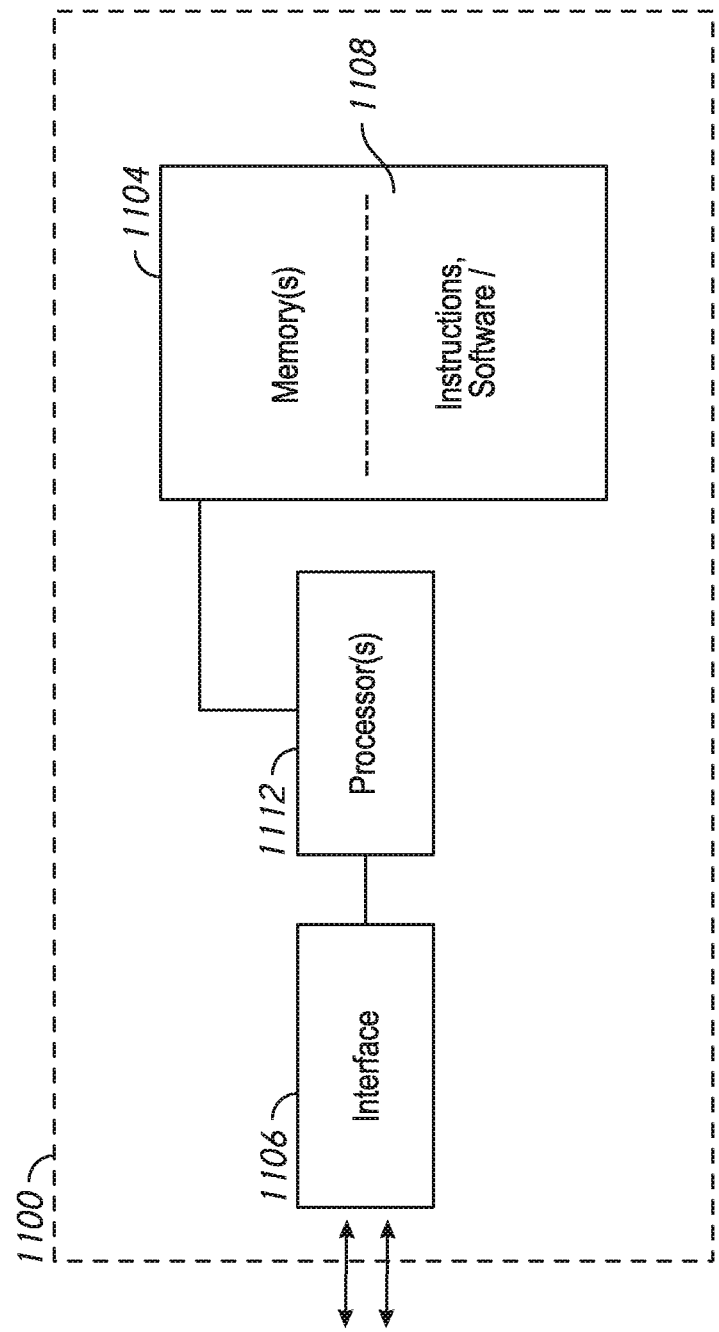
FIG. 11 is a block diagram of basic components of a network node, server, network element, network entity, or equipment according to some implementations of the present disclosure.

FIG. 11 is a block diagram of basic components of a network node 250a/250b, server, network element, network entity, or network equipment according to some implementations of the present disclosure. The network node 250 of FIG. 11 has components which may include one or more processors 1112 which are coupled to memory 1104 and to an interface 1106. Interface 1106 may be configured to connect to a network for communications. The one or more processors 1112 are configured to operate according to instructions 1108 stored in memory 1104, in order to perform basic operations as well as to perform techniques of the present disclosure. Relatedly, a computer program product may include a non-transitory computer-readable medium (e.g. memory, a computer disk, etc.) and computer instructions stored in the non-transitory computer-readable medium that, when executed by one or more processors of the network node, may perform the techniques of the present disclosure.

Note that the components and techniques shown and described in relation to the separate figures may indeed be provided as separate components and techniques, and alternatively one or more (or all of) the components and techniques shown and described in relation to the separate figures are provided together for operation in a cooperative manner.

Thus, methods and apparatus for use in selecting a mobile network route for data communications for a UE in a mobile network, suitable for use for data communications involving Internet of Things (IoT) devices, have been described. In one illustrative example, a message indicating a request for delivery of data to the UE (e.g. an IoT device, such as a CAT-M1 device) operative for communications in a mobile network may be received from an application server. One or more first loading or congestion indication values indicative of a first loading or congestion at one or more first network nodes along a first mobile network route (e.g. a route for IP data delivery) may be obtained. In addition, one or more second loading or congestion indication values indicative of a second loading or congestion at one or more second network nodes along a second mobile network route (e.g. a route for non-IP data delivery or NIDD) may be obtained. The first or the second mobile network route may be selected based on at least one of the one or more first and the second loading or congestion indication values (and e.g. subscription tier or type data). The data may be delivered to the UE over the selected mobile network route. In some implementations, when the UE is initially not attached to the network (e.g. for advantageous power-savings), the technique may further involve sending a message (e.g. an SMS message) which includes a request for the UE to attach, where the request includes an attach type associated with the selected mobile network route.

In another illustrative example, a network function entity of a mobile network may receive from an application server a message indicating a request for delivery of data to a user equipment (UE) operative for communications in a mobile network. The UE may be an IoT device, such as a CAT-M1 device. The network function entity may further receive from an evaluation function a first loading or congestion status indicator indicative of a first loading or congestion along a route of IP data delivery, and a second loading or congestion status indicator indicative of a second loading or congestion along a route for non-IP data delivery (NIDD). The network function entity may select one of the route for IP data delivery or the route for NIDD based on at least one of the first and the second loading or congestion status indicators. The network function entity may cause the data to be delivered to the UE via the selected route for IP data delivery or NIDD. In some implementations, when the UE is initially not attached to the network (e.g. for advantageous power-savings), the technique may further involve sending a message (e.g. an SMS message) which includes a request for the UE to attach, where the request includes an attach type associated with the selected mobile network route. In some further implementations, the network function entity is a service capability exposure function (SCEF) of a 4G/LTE mobile network, or alternatively a network exposure function (NEF) of a 5G mobile network.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. For example, note that CAT-M1 and NB IoT devices as well as their associated delivery methods are merely illustrative examples of IoT or M2M device types and delivery methods; other suitable alternative device types and delivery methods may be utilized as one ordinarily skilled in the art will readily appreciate (e.g. Long Range or "LoRA" type devices and associated delivery techniques).

It will also be understood that, although the terms "first," "second," etc. may be used herein to describe various elements, these elements should not be limited by these terms. These terms are only used to distinguish one element from another. For example, a first mobile network route could be termed a second mobile network route, and similarly, a second mobile network route could be termed a first mobile network route, without changing the meaning of the description, so long as all occurrences of the "first mobile network route" are renamed consistently and all occurrences of the "second mobile network route" are renamed consistently. The first mobile network route and the first mobile network route are both mobile network routes, but they are not the same mobile network route.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    receiving from an application server a message indicating a request for delivery of data to a user equipment (UE) operative for communications in a mobile network;
    obtaining one or more first loading or congestion indication values indicative of a first loading or congestion at one or more first network nodes which service a first mobile network route in the mobile network;
    obtaining one or more second loading or congestion indication values indicative of a second loading or congestion at one or more second network nodes which service a second mobile network route in the mobile network, the second mobile network route is a different route type than the first mobile network route and is a route for non-IP data delivery (NIDD);
    selecting one of the first mobile network route or the second mobile network route based on the one or more first loading or congestion indication values and the one or more second loading or congestion indication values; and
    causing the data to be delivered to the UE via a selected one of the first mobile network route or the second mobile network route.

2. The method of claim 1, further comprising:
    selecting one of a first attachment type or a second attachment type for attaching the UE to the mobile network based on the selected one of the first mobile network route or the second mobile network route, wherein the first mobile network route uses the first attachment type and the second mobile network route uses the second attachment type; and
    attaching the UE to the mobile network using a selected one of the first attachment type or the second attachment type.

3. The method of claim 1, wherein the causing the data to be delivered to the UE via a selected one of the first mobile network route or the second mobile network route includes associating the first mobile network route with a first type of data delivery for the UE and associating the second mobile network route with a second type of data delivery for the UE different from the first type of data delivery.

4. The method of claim 1,
    wherein the first mobile network route comprises another route for IP data delivery.

5. The method of claim 4, wherein the UE comprises a CAT-M1 device, the method further comprising:

sending another message indicating an attachment request for the UE to attach, the attachment request indicating an attach type comprising one of a first attach type for the IP data delivery or a second attach type for the NIDD.

6. The method of claim 5, wherein the another message comprises a short messaging service (SMS) message, the method further comprising:
buffering the data in the mobile network.

7. The method of claim 1, wherein the one or more first network nodes comprise a serving or packet data network gateway (S/P-GW), and the one or more second network nodes comprise a mobility management entity (MME); or
wherein the one or more first network nodes comprise a user plane function (UPF), and the one or more second network nodes comprise an access and mobility management function (AMF).

8. The method of claim 1, further comprising:
wherein the first mobile network route comprises another route for short message service (SMS) data delivery.

9. The method of claim 1, wherein selecting one of the first mobile network route or the second mobile network route includes selecting one of the first mobile network route and the second mobile network route based on the one or more first and second loading or congestion indication values and a subscription tier or type associated with the UE.

10. A network function entity comprising:
one or more processors;
memory coupled to the one or more processors; and
program instructions stored in the memory and executable by the one or more processors to:
receive from an application server a message indicating a request for delivery of data to a user equipment (UE) operative for communications in a mobile network;
obtain one or more first loading or congestion indication values indicative of a first loading or congestion at one or more first network nodes which service a first mobile network route in the mobile network;
obtain one or more second loading or congestion indication values indicative of a second loading or congestion at one or more second network nodes which service a second mobile network route in the mobile network, the second mobile network route is a different route type than the first mobile network route and is a route for non-IP data delivery (NIDD);
select one of the first mobile network route or the second mobile network route based on the one or more first loading or congestion indication values and the one or more second loading or congestion indication values; and
cause the data to be delivered to the UE via a selected one of the first mobile network route or the second mobile network route.

11. The network function entity of claim 10, wherein the program instructions further cause the one or more processors to:
select one of a first attachment type or a second attachment type for attaching the UE to the mobile network based on the selected one of the first mobile network route or the second mobile network route, wherein the first mobile network route uses the first attachment type and the second mobile network route uses the second attachment type; and
attach the UE to the mobile network using a selected one of the first attachment type or the second attachment type.

12. The network function entity of claim 10, wherein the program instructions further cause the one or more processors to cause the data to be delivered to the UE via a selected one of the first mobile network route or the second mobile network route by associating the first mobile network route with a first type of data delivery for the UE and associating the second mobile network route with a second type of data delivery for the UE different from the first type of data delivery.

13. The network function entity of claim 10, wherein the first mobile network route comprises a another route for IP data delivery.

14. The network function entity of claim 13, wherein the UE comprises a CAT-M1 device, the program instructions further cause the one or more processors to:
send another message indicating an attachment request for the UE to attach, the attachment request indicating an attach type comprising one of a first attach type for the IP data delivery or a second attach type for the NIDD.

15. The network function entity of claim 14, wherein the another message comprises a short messaging service (SMS) message, the program instructions further cause the one or more processors to:
buffer the data in the mobile network.

16. The network function entity of claim 10, wherein the one or more first network nodes comprise a serving or packet data network gateway (S/P-GW), and the one or more second network nodes comprise a mobility management entity (MME); or
wherein the one or more first network nodes comprise a user plane function (UPF), and the one or more second network nodes comprise an access and mobility management function (AMF).

17. A method comprising:
at a network function entity of a mobile network,
receiving, from an evaluation function, a first loading or congestion status indicator indicative of a first loading or congestion of one or more first functions that facilitate a delivery of data via a first route of the mobile network and a second loading or congestion status indicator indicative of a second loading or congestion of one or more second functions that facilitate the delivery of the data via a second route of the mobile network;
selecting one of the first route or the second route based on the first loading or congestion status indicator and the second loading or congestion status indicator; and
causing the data to be delivered to a user equipment (UE) via a selected one of the first route or the second route that is a route for a non IP data delivery.

18. The method of claim 17, wherein at least one of the one or more first functions is the same as the one or more second functions and wherein at least one other of the one or more first functions is different from the one or more second functions.

19. The method of claim 17, wherein the UE comprises a CAT-M1 device which is not attached to the mobile network, the method further comprising:
sending a message indicating a request for the UE to attach, the request indicating an attach type comprising one of an attach type for the first route that is an IP data delivery or the non IP data delivery.

20. The method of claim 1, further comprising:
obtaining one or more third loading or congestion indication values indicating a third loading or congestion at one or more third network nodes along a third mobile network route in the mobile network, the first mobile network route comprising a route for IP data delivery and a third mobile network route comprising a route for a short message service (SMS) data delivery; and selecting one route from among the first mobile network route, the second mobile network route, and the third mobile network route, based on the one route having lowest loading or congestion indication values from among the first loading or congestion indication values, the second loading or congestion indication values, and the third loading or congestion indication values.

\* \* \* \* \*